US012675131B2

(12) United States Patent
Fang et al.

(10) Patent No.: US 12,675,131 B2
(45) Date of Patent: Jul. 7, 2026

(54) INTERFACE DISPLAY METHOD AND ELECTRONIC DEVICE

(71) Applicant: Huawei Technologies Co., Ltd., Shenzhen (CN)

(72) Inventors: Dinggeng Fang, Wuhan (CN); Ming Li, Wuhan (CN); Puyao Qiao, Wuhan (CN); Haishan Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 18/306,717

(22) Filed: Apr. 25, 2023

(65) Prior Publication Data

US 2023/0315148 A1      Oct. 5, 2023

Related U.S. Application Data

(63) Continuation of application No. PCT/CN2021/123829, filed on Oct. 14, 2021.

(30) Foreign Application Priority Data

Oct. 28, 2020    (CN) .......................... 202011176906.0

(51) Int. Cl.
*G06F 1/16*        (2006.01)
*G06F 1/3246*      (2019.01)

(52) U.S. Cl.
CPC .......... *G06F 1/1626* (2013.01); *G06F 1/3246* (2013.01); *G06F 2200/1614* (2013.01); *G06F 2200/1637* (2013.01)

(58) Field of Classification Search
CPC ................. G06F 1/1626; G06F 1/3246; G06F 2200/1614; G06F 2200/1637; G06F 9/451;

(Continued)

(56) References Cited

U.S. PATENT DOCUMENTS

| 2010/0088532 A1 | 4/2010 | Pollock et al. |
| 2014/0092146 A1 | 4/2014 | Hitaka |

(Continued)

FOREIGN PATENT DOCUMENTS

| CN | 102063873 A | 5/2011 |
| CN | 103327148 B | * 2/2016 |

(Continued)

OTHER PUBLICATIONS

Zhang, Machine translation of CN-103327148-B (Year: 2016).*

(Continued)

*Primary Examiner* — Kee M Tung
*Assistant Examiner* — Xiaoming Wei
(74) *Attorney, Agent, or Firm* — Slater Matsil, LLP

(57)          ABSTRACT

An interface display method and an electronic device are provided. The method includes: performing screen-on interception in response to a screen wakeup operation performed by a user on an electronic device, to prevent a screen from being lit up; drawing an interface adapted to a screen orientation; and after the interface is drawn, disabling screen-on interception, and displaying the interface based on the screen orientation. The electronic device may collect and report data in real time through a sensor, and calculate a current screen orientation in real time, so that the drawn interface adapts to the current screen orientation.

21 Claims, 11 Drawing Sheets

(58) Field of Classification Search
CPC .......... H04M 2250/12; H04M 1/72454; Y02D
30/70
See application file for complete search history.

(56) References Cited

U.S. PATENT DOCUMENTS

| | | | |
|---|---|---|---|
| 2015/0185811 A1* | 7/2015 | Connell ................ | G06F 9/4418 |
| | | | 345/173 |
| 2017/0090683 A1* | 3/2017 | Liu ........................ | H04M 1/67 |
| 2020/0110566 A1* | 4/2020 | Reeves ................... | H04W 4/02 |

FOREIGN PATENT DOCUMENTS

| | | | |
|---|---|---|---|
| CN | 105739986 A | 7/2016 |
| CN | 107071129 A | 8/2017 |
| CN | 108038359 A | 5/2018 |
| CN | 108762814 A | 11/2018 |
| CN | 110865858 A | 3/2020 |
| JP | 2006313313 A | 11/2006 |
| JP | 2017138956 A | 8/2017 |
| WO | 2016051947 A1 | 4/2016 |

OTHER PUBLICATIONS

Yun hen: "Android Screen Conversion Process and Optimization (Google Screen Conversion Algorithm)." Nov. 30, 2023. total 5 pages.

* cited by examiner (a)

(b)

(c)

(d)

INTERFACE DISPLAY METHOD AND ELECTRONIC DEVICE

CROSS-REFERENCE TO RELATED APPLICATIONS

This application is a continuation of International Application No. PCT/CN2021/123829, filed on Oct. 14, 2021, which claims priority to Chinese Patent Application No. 202011176906.0, filed on Oct. 28, 2020. The disclosures of the aforementioned applications are hereby incorporated by reference in their entireties.

TECHNICAL FIELD

This application relates to the terminal field, and more specifically, to an interface display method and an electronic device.

BACKGROUND

Currently, interfaces of most terminal devices (such as a mobile phone and a tablet) may be rotated based on rotation of screen orientations with support of an application, to assist users in viewing in a landscape or portrait state.

In a possible scenario, after screen-off of a terminal device, a screen orientation is rotated. After a screen is woken up, the terminal device usually first displays an interface obtained before screen rotation, and then switches, by playing a screen rotation animation, to an interface obtained after screen rotation. For example, a screen of the mobile phone is in a portrait display state before screen-off. Before the screen is woken up, if the screen of the mobile phone is rotated by 90°, that is, to a landscape display state, once the screen is woken up, the mobile phone usually first loads a layout for portrait display, and draws and displays an interface. Then, the mobile phone calculates a screen orientation. When the mobile phone determines that the screen is rotated to a landscape state, the mobile phone loads a layout for landscape display, draws an interface, and finally loads and plays a screen rotation animation. An entire process may take a long time. Consequently, a user cannot perform a screen operation within a long period of time after the screen of the mobile phone is woken up.

SUMMARY

Embodiments of this application provide an interface display method and an electronic device, to reduce waiting time in which a user cannot perform an operation when a screen of the electronic device is rotated after screen-off and then is woken up.

According to a first aspect, this application provides an interface display method. The method may be performed by an electronic device, or may be performed by a processor disposed in an electronic device. This is not limited in this embodiment of this application.

For example, the method includes: performing screen-on interception in response to a screen wakeup operation performed by a user on the electronic device, to prevent a screen from being lit up; drawing an interface that adapts to a screen orientation; and disabling screen-on interception for the screen, and displaying the interface based on the screen orientation.

Based on the foregoing solution, after screen-off, the electronic device may temporarily not light up, based on the screen wakeup operation performed by the user, the screen for display. The electronic device may first obtain the screen orientation, and perform layout loading and interface drawing based on the screen orientation, to obtain the interface that adapts to the current screen orientation. The electronic device may light up the screen to display the interface after interface drawing is completed. As a result, the user can directly perform an operation after screen-on, and waiting time in which the user cannot perform an operation is greatly reduced.

With reference to the first aspect, in some possible implementations, before the performing screen-on interception in response to a screen wakeup operation performed by a user on the electronic device, the method further includes: entering screen-off when the screen orientation of the electronic device is a first orientation.

In a possible case, when the screen orientation of the electronic device is the first orientation, the electronic device detects a screen-off operation performed by the user on the electronic device, and enters screen-off in response to the screen-off operation performed by the user on the electronic device.

It should be understood that the user may perform different operations to turn off the screen. A specific screen-off operation performed by the user is not limited in this application.

In another possible case, when the screen orientation of the electronic device is the first orientation, the electronic device automatically enters screen-off because standby time reaches a preset threshold.

It should be understood that a condition for triggering the electronic device to enter screen-off is not limited in this application.

With reference to the first aspect, in some possible implementations, the method further includes: when the screen orientation of the electronic device switches to a second orientation, detecting a screen wakeup operation performed by the user on the electronic device.

It should be understood that the user may perform different operations to wake up the screen. A specific screen wakeup operation is not limited in this application.

Based on the foregoing solution, when the screen of the electronic device is rotated after screen-off, even if the screen wakeup operation performed by the user is detected, the electronic device can directly display the interface that can adapt to the screen orientation.

In contrast, in a current technology, if the screen of the electronic device is rotated after screen-off, once a screen wakeup operation of the user is detected, a procedure for layout loading for an interface used before screen-off, and for interface drawing, a procedure for screen rotation animation loading and playing, and the like need to be performed. In the solutions provided in this application, the procedure for layout loading for the interface used before screen-off of the electronic device, and interface drawing, the procedure for screen rotation animation loading and playing, and the like can be cut. This greatly reduces waiting time in which the user cannot perform an operation.

With reference to the first aspect, in some possible implementations, before the drawing an interface that adapts to a screen orientation, the method further includes: obtaining the screen orientation of the electronic device.

Optionally, the obtaining the screen orientation of the electronic device includes: collecting data in real time through a sensor; and calculating the screen orientation based on the collected data.

The data is collected in real time through the sensor, and the screen orientation is calculated in real time based on the collected data. This can reduce waiting time for subsequently obtaining the screen orientation.

It should be understood that collecting the data in real time through the sensor is merely a possible implementation. With the development of technologies, a response speed of the sensor is improved. For example, data collection and reporting, and screen orientation calculation can be completed within 10 milliseconds (ms). In this case, when the electronic device detects a screen wakeup operation performed by the user, the electronic device may alternatively trigger the sensor to collect and report data, and then may calculate the screen orientation. This can reduce large power consumption caused by real-time data collection and calculation in the background.

Optionally, the sensor is a gravity sensor.

It should be understood that collecting, through the gravity sensor, data for calculating a screen orientation is merely a possible implementation, and should not constitute any limitation on this embodiment of this application. This application does not exclude a possibility that another sensor is used to collect data for calculating a screen orientation.

With reference to the first aspect, in some possible implementations, the performing screen-on interception on the screen includes: setting, to a first brightness value, backlight brightness of a backlight panel configured to provide a light source for the screen, so that the screen is dimmed.

Optionally, the first brightness value is 0. Alternatively, the first brightness value may be a small value.

It should be understood that, an objective of setting the backlight brightness of the backlight panel to the first brightness value is to disable the backlight panel to provide a sufficient light source for the screen, so that the screen cannot normally display an interface. For the user, when the backlight brightness of the backlight panel is set to the first brightness value, the screen is dimmed.

With reference to the first aspect, in some possible implementations, the disabling screen-on interception for the screen includes: setting the backlight brightness of the backlight panel to a second brightness value, so that the screen is lit up, where the second brightness value is greater than the first brightness value.

It should be understood that, an objective of setting the backlight brightness of the backlight panel to the second brightness value is to enable the backlight panel to provide a sufficient light source for the screen, so that the screen can normally display an interface. For the user, when the backlight brightness of the backlight panel is set to the second brightness value, the screen is lit up, and the user can normally view the interface on the screen.

It should be further understood that implementing screen-on interception and disabling screen-on interception by using the backlight brightness is merely a possible implementation. This application does not exclude a possibility that screen-on interception is implemented and disabled in other possible manners.

According to a second aspect, an electronic device is provided. The electronic device is configured to perform the method according to any one of the first aspect or the possible implementations of the first aspect. The electronic device may include modules or units configured to perform the method according to any one of the first aspect and the possible implementations of the first aspect. It should be understood that the modules or units may implement corresponding functions by executing computer programs.

According to a third aspect, an electronic device is provided. The electronic device includes a memory and a processor. The processor is configured to perform program instructions in the memory, to enable the electronic device to implement the method according to any one of the first aspect or the possible implementations of the first aspect.

According to a fourth aspect, a computer-readable storage medium is provided. The computer-readable storage medium is configured to store a computer program. When the computer program is executed by a computer or a processor, the method according to any one of the first aspect or the possible implementations of the first aspect is implemented.

According to a fifth aspect, a computer program product is provided. The computer program product includes instructions. When the instructions are executed, a computer is enabled to perform the method according to any one of the first aspect and the possible implementations of the first aspect.

According to a sixth aspect, a system-on-chip or a system chip is provided. The system-on-chip or the system chip may be used in an electronic device. The system-on-chip or the system chip includes at least one communication interface, at least one processor, and at least one memory. The communication interface, the memory, and the processor are interconnected through a bus. The processor executes instructions stored in the memory, to enable the electronic device to perform the method according to any one of the first aspect or the possible implementations of the first aspect.

DETAILED DESCRIPTION OF ILLUSTRATIVE EMBODIMENTS

The following describes technical solutions of this application with reference to accompanying drawings.

A method provided in embodiments of this application may be applied to an electronic device such as a mobile phone, a tablet computer, a wearable device, a vehicle-mounted device, an augmented reality (AR)/virtual reality (VR) device, a notebook computer, a personal computer (PC), an ultra-mobile personal computer (UMPC), a netbook, a personal digital assistant (PDA), or a distributed device. A specific type of the electronic device is not limited in embodiments of this application.

In addition, the method in embodiments of this application may support operating environments such as Linux, Android, Harmony operating system (HarmonyOS), Mac, IOS, Windows, and an internet of things operating system (for example, LiteOS). This is not limited in embodiments of this application.

Figure 1:
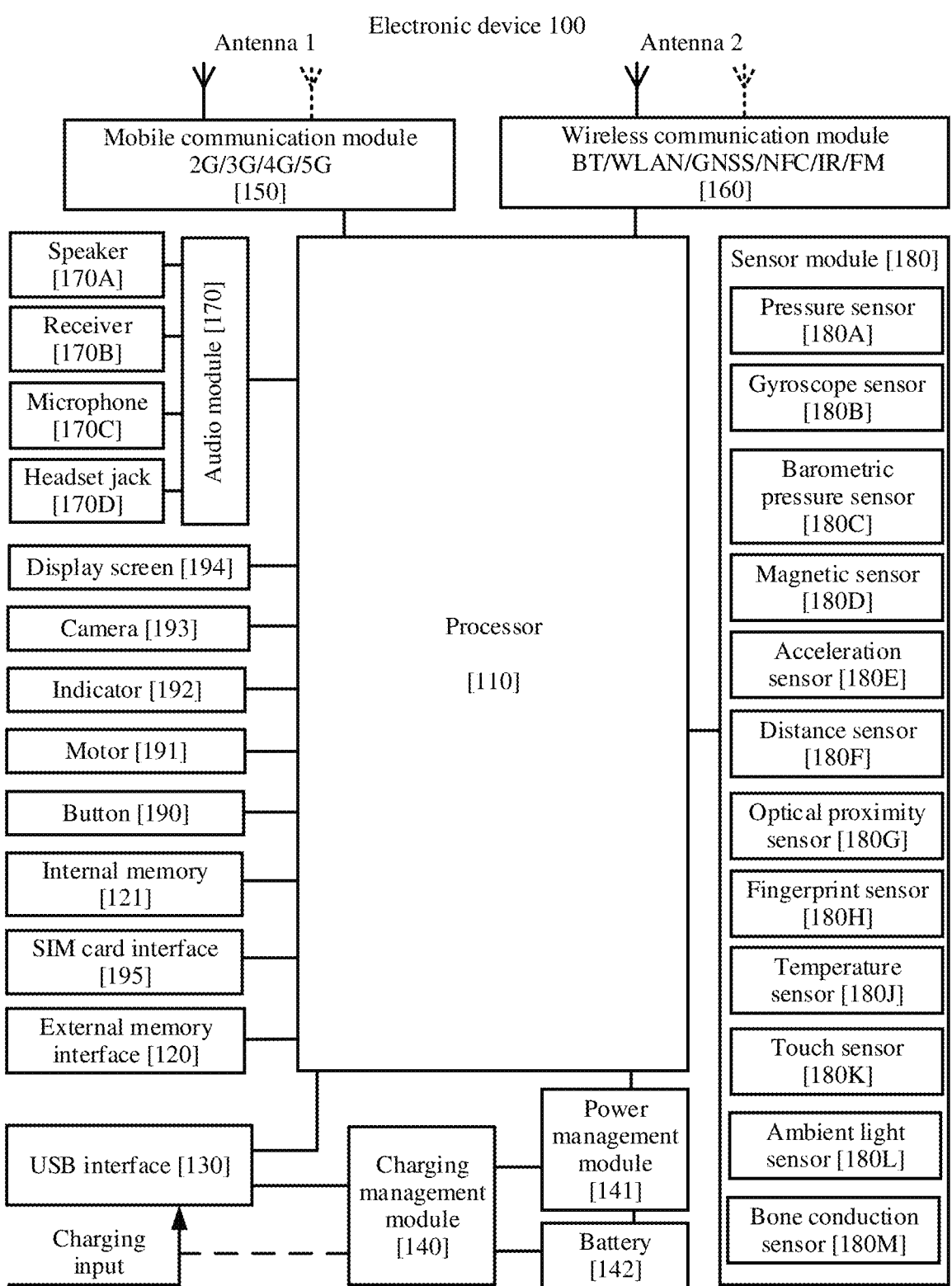
FIG. 1 is a schematic diagram of a structure of an electronic device applicable to an interface display method according to an embodiment of this application.

For example, FIG. 1 is a schematic diagram of a structure of an electronic device 100. As shown in FIG. 1, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented in hardware, software, or a combination of software and hardware.

The processor 110 may include one or more processing units. For example, the processor 110 may include one or more of an application processor (AP), a modem processor, a graphics processing unit (GPU), an image signal processor (ISP), a controller, a memory, a video codec, a digital signal processor (DSP), a baseband processor, a neural-network processing unit (NPU), and the like. Different processing units may be independent components, or may be integrated into one or more processors.

The application processor outputs a sound signal through the audio module 170 (for example, the speaker 170A), or displays an image or a video on the display screen 194.

The controller may be a nerve center and a command center of the electronic device 100. The controller may generate an operation control signal based on an instruction operation code and a timing signal, to implement control on instruction fetching and execution.

The processor 110 may further be provided with a memory. The memory is configured to store instructions and data. In some embodiments, the memory in the processor 110 is a cache memory. The memory may store an instruction or data that has been used or is cyclically used by the processor 110. If the processor 110 needs to use the instruction or the data again, the processor 110 may directly invoke the instruction or the data from the memory. This avoids repeated storage and reading, reduces waiting time of the processor 110, and improves system efficiency.

The processor 110 may perform different operations by executing instructions, to implement different functions. For example, the instructions may be instructions pre-stored in the memory before delivery of the device, or may be instructions read from a new application (APP) after a user installs the app during use. This is not limited in this embodiment of this application.

The processor 110 may control or invoke another component to perform an interface display method provided in embodiments of this application. For example, the processor 110 invokes a processing program that is stored in the internal memory and that is in this embodiment of this application, or invokes, through the external memory interface, a processing program that is stored in a third-party device and that is in this embodiment of this application. In this way, the processor 110 controls the display screen to temporarily skip being lit up for display, and to be lit up for display after an interface is drawn based on a correct screen orientation. When the screen of the electronic device is rotated after screen-off, unnecessary procedures can be cut. For example, a procedure for layout loading for an interface used before screen-off, and interface drawing, and a procedure for screen rotation animation loading and playing can be cut. As a result, waiting time of the user can be reduced, and user experience can be improved. The processor 110 may include different components. For example, when a CPU and a GPU are integrated into the processor 110, the CPU and the GPU may work together to perform the interface display method provided in embodiments of this application. For example, some algorithms in the interface display method are performed by the CPU, and the other algorithms are performed by the GPU, to achieve high processing efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a bidirectional synchronous serial bus, including a serial data line (SDA) and a serial clock line (SCL). In some embodiments, the processor 110 may include a plurality of I2C buses. The processor 110 may be coupled to the touch sensor 180K, a charger, a camera flash, the camera 193, and the like separately through different I2C bus interfaces. For example, the processor 110 may be coupled to the touch sensor 180K through the I2C interface. Therefore, the processor 110 may communicate with the touch sensor 180K through the I2C bus interface, to implement a touch function of the electronic device 100.

The I2S interface may be configured to perform audio communication. In some embodiments, the processor 110 may include a plurality of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering calls through a Bluetooth headset.

The PCM interface may also be configured to perform audio communication, and sample, quantize, and code an analog signal. In some embodiments, the audio module 170 and the wireless communication module 160 may be coupled through the PCM bus interface. In some embodiments, the audio module 170 may also transmit an audio signal to the wireless communication module 160 through the PCM interface, to implement a function of answering calls through a Bluetooth headset. Both the I2S interface and the PCM interface may be configured to perform audio communication.

The UART interface is a universal serial data bus, configured to perform asynchronous communication. The bus may be a bidirectional communication bus. The bus converts to-be-transmitted data from serial to parallel or from parallel to serial for communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display screen 194 or the camera 193. MIPI interfaces include a camera serial interface (CSI), a display serial interface (DSI), and the like. In some embodiments, the processor 110 communicates with the camera 193 through the CSI interface, to implement a photographing function of the electronic device 100. The processor 110 communicates with the display screen 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, or the like. The GPIO interface may alternatively be configured as an I2C interface, an I2S interface, a UART interface, a MIPI interface, or the like.

The USB interface 130 is an interface that conforms to the USB standard specification, and may be specifically a mini USB interface, a micro USB interface, a USB Type-C interface, or the like. The USB interface 130 may be configured to connect to the charger, to charge the electronic device 100, and may also be configured to transmit data between the electronic device 100 and a peripheral device. The USB interface 130 may also be configured to connect to a headset, to play audio through the headset. The interface may further be configured to connect to another electronic device such as an AR device.

It may be understood that an interface connection relationship between the modules illustrated in this application is merely an example for description, and does not constitute a limitation on the structure of the electronic device 100. In some other embodiments, the electronic device 100 may alternatively use an interface connection manner different from those in the foregoing embodiments, or use a combination of a plurality of interface connection manners.

The charging management module 140 is configured to receive a charging input from the charger. The charger may be a wireless charger or a wired charger. In some wired charging embodiments, the charging management module 140 may receive a charging input from the wired charger through the USB interface 130. In some wireless charging embodiments, the charging management module 140 may receive a wireless charging input through a wireless charging coil of the electronic device 100. In addition to charging the battery 142, the charging management module 140 may further supply power to the electronic device through the power management module 141.

The power management module 141 is configured to connect to the battery 142, the charging management module 140, and the processor 110. The power management module 141 receives an input from the battery 142 and/or an input from the charging management module 140, to supply power to the processor 110, the internal memory 121, an external memory, the display screen 194, the camera 193, the wireless communication module 160, and the like. The power management module 141 may further be configured to monitor parameters such as a battery capacity, a battery cycle count, and a battery health state (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution, applied to the electronic device 100, to wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in the same component as at least some modules of the processor 110.

The modem processor may include a modulator and a demodulator. The modulator is configured to modulate to-be-sent low frequency baseband signals into medium and high frequency signals. The demodulator is configured to demodulate a received electromagnetic wave signal into a low frequency baseband signal. Then, the demodulator transmits the demodulated low frequency baseband signal to the baseband processor for processing. The low frequency baseband signal is processed by the baseband processor and then transmitted to the application processor. The application processor outputs a sound signal through an audio device (not limited to the speaker 170A, the receiver 170B, or the like), or displays an image or a video through the display screen 194. In some embodiments, the modem processor may be an independent component. In some other embodiments, the modem processor may be independent of the processor 110, and disposed in the same component as the mobile communication module 150 or another function module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), a fifth generation (5G) communication system, BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display screen 194, the application processor, and the like. The GPU is a microprocessor for image processing, and is connected to the display screen 194 and the application processor. The GPU is configured to perform mathematical and geometric calculation, and render graphics. The processor 110 may include one or more GPUs. The one or more GPUs execute program instructions to generate or change display information.

The display screen 194 may also be referred to as a screen, and may be configured to display an image, a video, and the like. The display screen 194 may include a display panel. The display panel may be a liquid crystal display (LCD), an organic light-emitting diode (OLED), an active-matrix organic light emitting diode or an active-matrix organic light emitting diode (AMOLED), a flexible light-emitting diode (FLED), a mini-LED (Mini-LED), a micro-LED, a micro-OLED, a quantum dot light-emitting diode (QLED), or the like. In some embodiments, the electronic device 100 may include one or more display screens 194.

It should be understood that the display screen 194 may further include more components such as a backlight panel and a drive circuit. The backlight panel may be configured to provide a light source. The display panel emits light based on the light source provided by the backlight panel. The drive circuit may be configured to control a liquid crystal of a liquid crystal layer to transmit light or not to transmit light.

The electronic device 100 may implement a photographing function through the ISP, the camera 193, the video codec, the GPU, the display screen 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may also perform optimization on noise, brightness, and a skin tone of an image by using algorithms. The ISP may also optimize parameters such as exposure and a color temperature in a photographing scene. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more types of video codecs. In this way, the electronic device 100 can play or record videos in a plurality of coding formats, for example, moving picture experts group (MPEG)-1, MPEG-2, MPEG-3, and MPEG-4.

The external memory interface 120 may be configured to connect to an external memory card, for example, a micro SD card, to extend a storage capability of the electronic device 100. The external memory card communicates with the processor 110 through the external memory interface 120, to implement a data storage function. For example, the external memory card stores files such as music and a video.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required for at least one function (such as a sound playing function and an image display function), and the like. The data storage area may store data (for example, audio data and an address book) created during use of the electronic device 100, and the like. In addition, the internal memory 121 may include a high-speed random access memory, or may include a nonvolatile memory, for example, at least one disk memory, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The gyroscope sensor 180B may be configured to determine a motion posture of the electronic device 100. In some embodiments, angular velocities of the electronic device 100 around three axes (namely, the x-axis, the y-axis, and the z-axis) may be determined by using the gyroscope sensor 180B. The gyroscope sensor 180B may be configured to implement image stabilization during photographing. For example, when the shutter is pressed, the gyroscope sensor 180B detects an angle at which the electronic device 100 shakes; calculates, based on the angle, a distance for which a lens module needs to compensate; and enables the lens to cancel the shake of the electronic device 100 through reverse motion, to implement image stabilization. The gyroscope sensor 180B may be further used in a navigation scenario and a motion-sensing game scenario.

The acceleration sensor 180E may detect accelerations in various directions (usually of three axes) of the electronic device 100, and When the electronic device 100 is still, a magnitude and a direction of gravity may be detected.

The acceleration sensor 180E may be further configured to identify a posture of the electronic device, and is used for applications such as landscape/portrait mode switching and a pedometer. A gravity sensor described below that is used to calculate a screen orientation of the electronic device is one type of the acceleration sensor 180E. A value of the gravity sensor is generally expressed with a gravity acceleration g=9.8 meters per second squared (m/s²).

The touch sensor 180K may also be referred to as a "touch panel". The touch sensor 180K may be disposed on the display screen 194, and the touch sensor 180K and the display screen 194 constitute a touchscreen, which is also referred to as a "touch screen". In specific implementation, the touch sensor 180K may be configured to detect a touch operation performed on or near the touch sensor 180K. The touch sensor may transfer the detected touch operation to the application processor, to determine a type of a touch event. The touch sensor 180K may further provide a visual output related to the touch operation on the display screen 194.

In some other embodiments, the touch sensor 180K may alternatively be disposed on a surface of the electronic device 100 in a position different from that of the display screen 194. For example, the touch sensor 180K may be disposed on a power on/off button (or referred to as a power button), and the user may press the power on/off button to implement screen wakeup and fingerprint recognition at the same time.

The button 190 includes a power on/off button (or referred to as an on/off button or a power button), a volume button, and the like. The button 190 may be a mechanical button or a touch button. The electronic device 100 may receive a button input, and generate a button signal input related to a user setting and function control of the electronic device 100. For example, in this embodiment of this application, the user may press or touch the power on/off button 190 to implement screen-off and screen wakeup functions.

The motor 191 may generate a vibration alert. The motor 191 may be configured to provide vibration alerts for an incoming call, and may also be configured to provide a vibration feedback for a touch. For example, touch operations that act on different applications (such as photographing and audio playing) may correspond to different vibration feedback effects. The motor 191 may provide different vibration feedback effects corresponding to touch operations performed on different areas of the display screen 194. Different application scenarios (for example, a time prompt, information receiving, an alarm clock, and a game) may also correspond to different vibration feedback effects. A vibration feedback effect for a touch may be further user-defined.

The indicator 192 may be an indicator light. The indicator 192 may be configured to indicate a charging state and a power change, and may also be configured to indicate a message, a missed call, a notification, and the like.

The SIM card interface 195 is configured to connect to a SIM card. The SIM card may be inserted into the SIM card interface 195 or disconnected from the SIM card interface 195, to implement contact with or separation from the electronic device 100. The electronic device 100 may support one or more SIM card interfaces. The SIM card interface 195 may support a nano-SIM card, a micro-SIM card, a SIM card, and the like. A plurality of cards may be inserted into one SIM card interface 195 at the same time. The plurality of cards may be in a same type or in different types. The SIM card interface 195 may also be compatible with different types of SIM cards. The SIM card interface 195 may also be compatible with an external memory card. The electronic device 100 interacts with a network through the SIM card, to implement functions such as a call function and a data communication function. In some embodiments, the electronic device 100 uses an eSIM, namely, an embedded SIM card. The eSIM card may be embedded into the electronic device 100, and cannot be separated from the electronic device 100.

It may be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented in hardware, software, or a combination of software and hardware.

A software system of the electronic device 100 may use a layered architecture, an event-driven architecture, a microkernel architecture, a micro service architecture, or a cloud architecture. In this application, an Android system of a layered architecture is used as an example to describe a software structure of the electronic device 100. A type of an operating system of the electronic device is not limited in this application. For example, the operating system of the electronic device may be an Android system or a HarmonyOS system.

Figure 2:
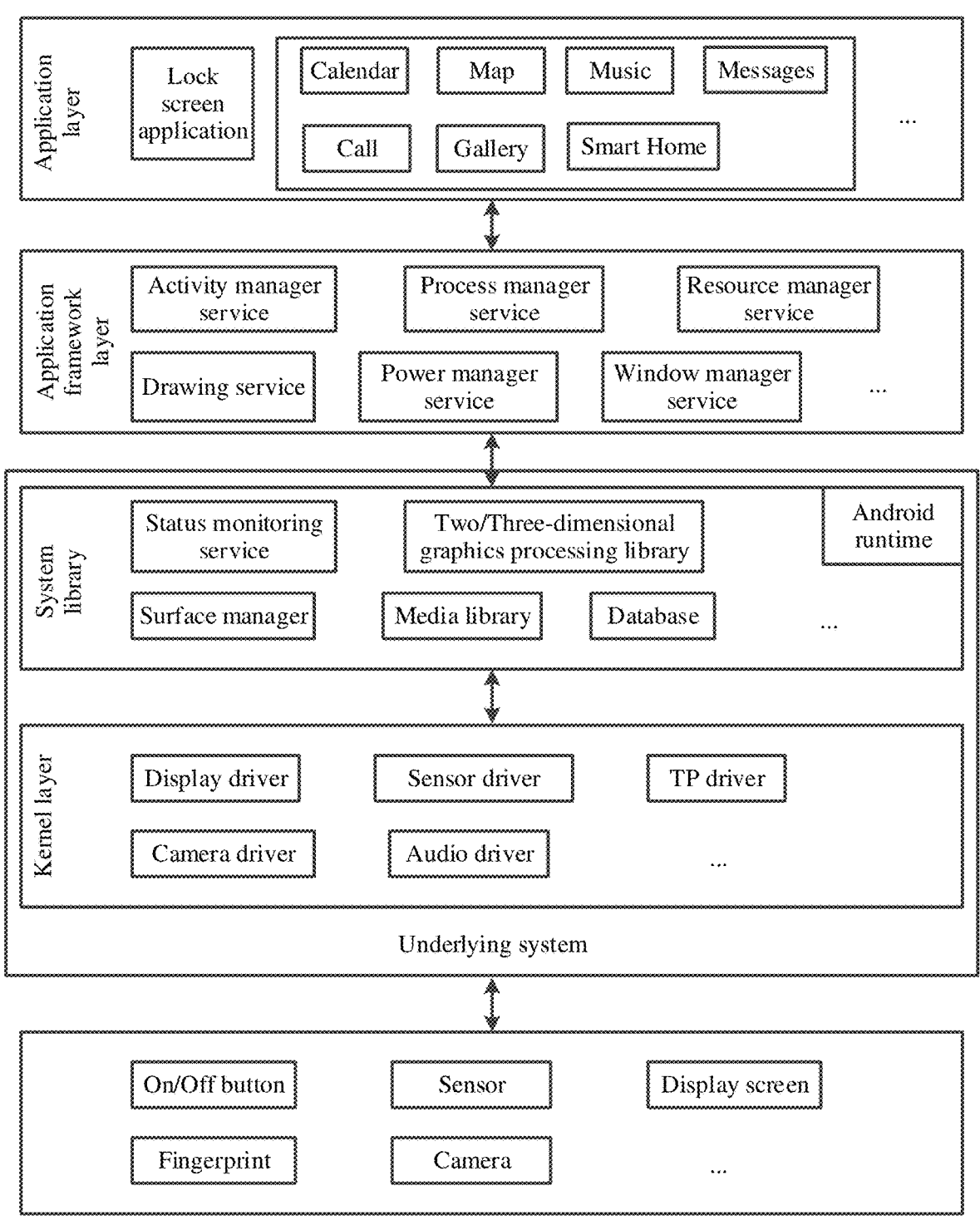
FIG. 2 is a block diagram of software and hardware structures of an electronic device applicable to an interface display method according to an embodiment of this application.

FIG. 2 is a block diagram of software and hardware structures of an electronic device applicable to a method according to an embodiment of this application.

As shown in FIG. 2, a layered architecture divides software into several layers. Each of the layers has a clear role and task. The layers communicate with each other through a software interface. In some embodiments, an Android system is divided into four layers: an application layer, an application framework layer, Android runtime and a system library, and a kernel layer from top to bottom.

The application layer may include a series of application packages. As shown in FIG. 2, the application layer may include a lock screen application, a desktop application, and the like. The desktop application may further include applications such as Camera, Gallery, Calendar, Call, Map, Navigation, WLAN, Bluetooth, Music, Video, Game, Shopping, Travel, Instant Messaging (such as Messages and WeChat), Smart Home, and Device Control.

The Smart Home application may be used to control or manage a home device having a networking function. For example, the home device may include an electric light, a television, and an air conditioner. For another example, the home device may further include an anti-theft door lock, a sound box, a floor sweeping robot, a socket, a body fat scale, a desk lamp, an air purifier, a refrigerator, a washing machine, a water heater, a microwave oven, an electric cooker, a curtain, a fan, a television, a set-top box, a door, and a window.

The application framework layer provides an application programming interface (API) and a programming framework for an application at the application layer. The application framework layer includes some predefined functions. As shown in FIG. 2, the application framework layer may include an input manager service (IMS), a display policy service, a power manager service (PMS), a display manager service (DMS), an activity manager service, a resource manager service, a content provider service, a view system, a phone manager service, a notification manager service, a window manager service, a process manager service, a drawing service, and the like. This is not limited in this embodiment of this application.

The window manager service may be configured to manage a window program. The window manager service may obtain a size of a display screen, determine whether there is a status bar, perform screen locking, take a screenshot, and so on.

The content provider service may be configured to store and obtain data, and make the data accessible to an application. The data may include a video, an image, an audio, calls that are made and answered, a browsing history and a bookmark, an address book, and the like.

The view system includes visual controls such as a control for displaying a text and a control for displaying an image. The view system may be used to construct an application. A display interface may include one or more views. For example, a display interface including a message notification icon may include a text display view and an image display view.

The phone manager service is configured to provide a communication function of an electronic device 100, for example, management of call states (including answering, declining, and the like).

The resource manager service provides various resources such as a localized character string, an icon, an image, a layout file, and a video file, for an application.

The notification manager service enables an application to display notification information in the status bar, and may be configured to convey a notification message. The displayed notification information may automatically disappear after a short stay without user interaction. For example, a notification manager is configured to notify download completion and provide a message notification. The notification manager may alternatively be a notification that appears in the status bar at the top of the system in the form of a chart or scroll bar text, such as a notification for an application running in the background, or a notification that appear on the screen in the form of a dialog window. For example, text information is displayed in the status bar, an announcement is given, the electronic device vibrates, or an indicator light blinks.

The drawing service may be configured to draw an interface. For example, the drawing service may convert a layout and a resource of an application into a format that can be recognized by a display service at the kernel layer. The drawing service may send the drawn interface to the display service at the kernel layer, to display the drawn interface.

The Android runtime may include a core library and a virtual machine. The Android runtime is responsible for scheduling and management of the Android system.

The core library may include two parts: a function to be called by the Java language, and a core library of the Android system.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules such as a state monitoring service, a surface manager, a media library (media libraries), a three-dimensional graphics processing library (for example, OpenGL ES), and a two-dimensional (2D) graphics engine (for example, SGL).

The state monitoring service is configured to determine a specific orientation of a mobile phone, a physical state of a flexible display, and the like based on monitoring data reported by the kernel layer. The surface manager is configured to manage a display subsystem and provide a fusion of 2D and three-dimensional (3D) layers for a plurality of applications. The media library supports a plurality of common audio and video formats for playback and recording, as well as still image files. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a power manager service, a sensor service (which may also be referred to as a sensor driver), a display service (which may also be referred to as a display driver), a camera driver, an audio driver, and the like. This is not limited in this embodiment of this application.

Still as shown in FIG. 2, the system library and the kernel layer, and the like below the application framework layer may be referred to as an underlying system. The underlying system includes an underlying display system configured to provide the display service. For example, the underlying display system includes the display driver at the kernel layer, the surface manager in the system library, and the like.

Below the underlying system is hardware. The hardware provides a basis for software running. As shown in FIG. 2, hardware of the electronic device may include but is not limited to a power on/off button, a sensor, a display screen, a fingerprint, a camera, and the like.

For ease of description, in the following embodiments, the application framework layer may be referred to as a framework layer for short, and the application layer may be referred to as an app layer for short.

Currently, most electronic devices support viewing in a landscape or portrait state, to meet different requirements of a user. In most cases, a screen of an electronic device is rotated when the screen is in an off state, and then the screen is woken up. For example, the screen is turned off in the portrait state, and is woken up after the screen switches to the landscape state. The user may wait for a long time before performing a screen operation.

Figure 3:
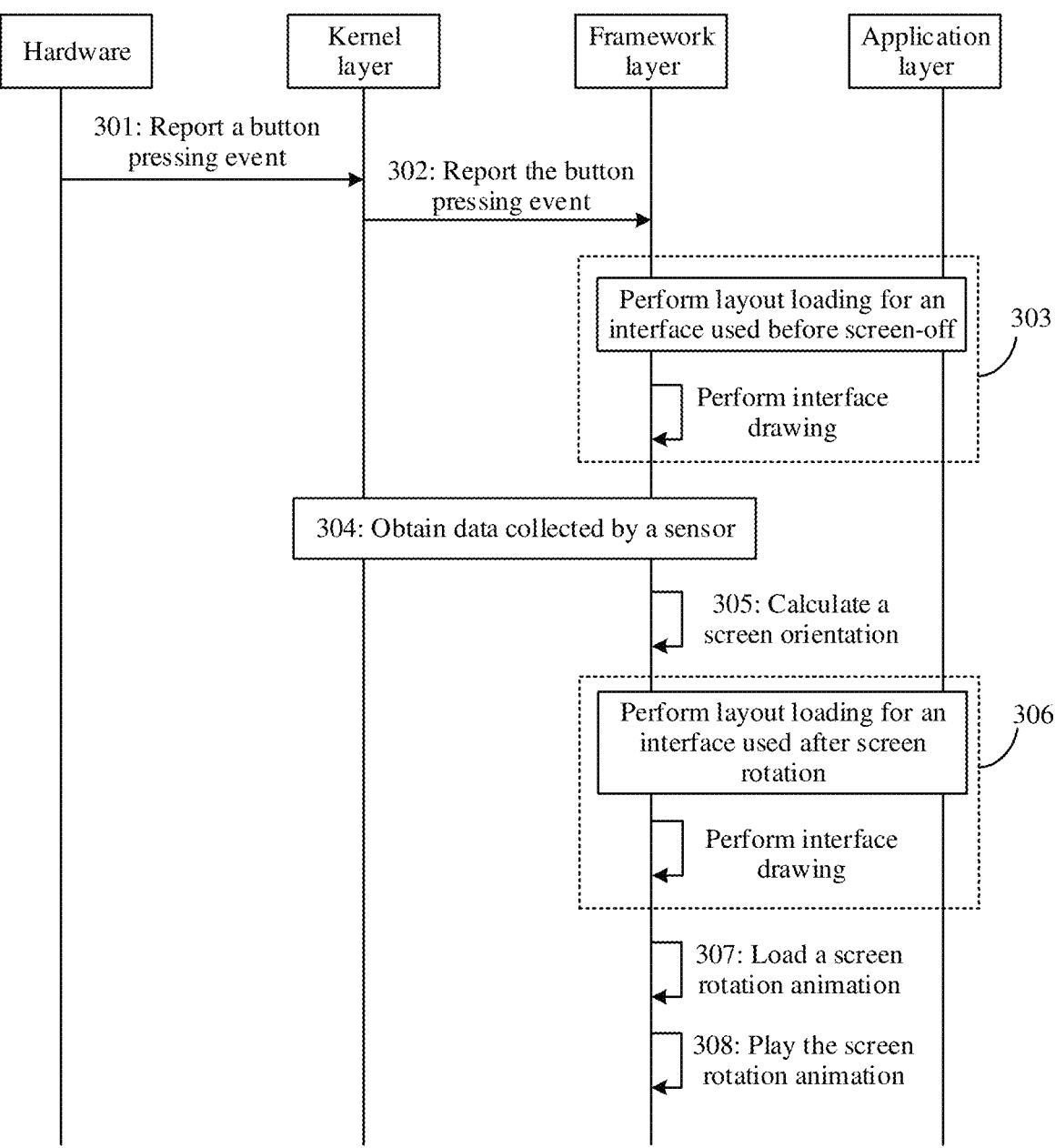
FIG. 3 is a schematic diagram of a procedure performed by an electronic device in a process in which a screen of the electronic device is rotated when the screen is in an off state, and then the screen is woken up.

For ease of understanding, FIG. 3 shows procedures that may be performed by an electronic device in a process in which a screen of the electronic device is rotated when the screen is in an off state, and then the screen is woken up. As shown in FIG. 3, the electronic device may undergo a procedure for layout loading before screen-off, and drawing; a procedure for screen orientation calculation; a procedure for layout loading after screen rotation, and drawing; and a procedure for screen rotation animation loading and playing.

FIG. 3 describes the foregoing procedures from a perspective of interaction between layers of software of the electronic device and interaction between the software and hardware. FIG. 3 shows steps 301 to 308. Step 303 is a procedure for layout loading for an interface used before screen-off of the electronic device, and interface drawing. Steps 304 and 305 are the procedure for screen orientation calculation. Step 306 is the procedure for layout loading after screen rotation, and drawing. Steps 307 and 308 are the procedure for screen rotation animation loading and playing. The following describes the steps in FIG. 3 in detail.

Step 301: The electronic device reports a button pressing event to a kernel layer in response to an operation of pressing a power on/off button by a user.

It should be understood that pressing the power on/off button by the user is a possible implementation of a screen wakeup operation performed by the user, and the user may alternatively perform another operation to wake up the screen.

Herein, to wake up the screen is to light up the screen again, where the screen is originally in the off state. Then, the user may perform a screen operation on the screen that is woken up.

Step 302: The kernel layer reports the button pressing event to a framework layer.

Step 303: Based on the button pressing event reported by the kernel layer, the framework layer performs layout loading for an interface used before screen-off and performs interface drawing.

Figure 4:
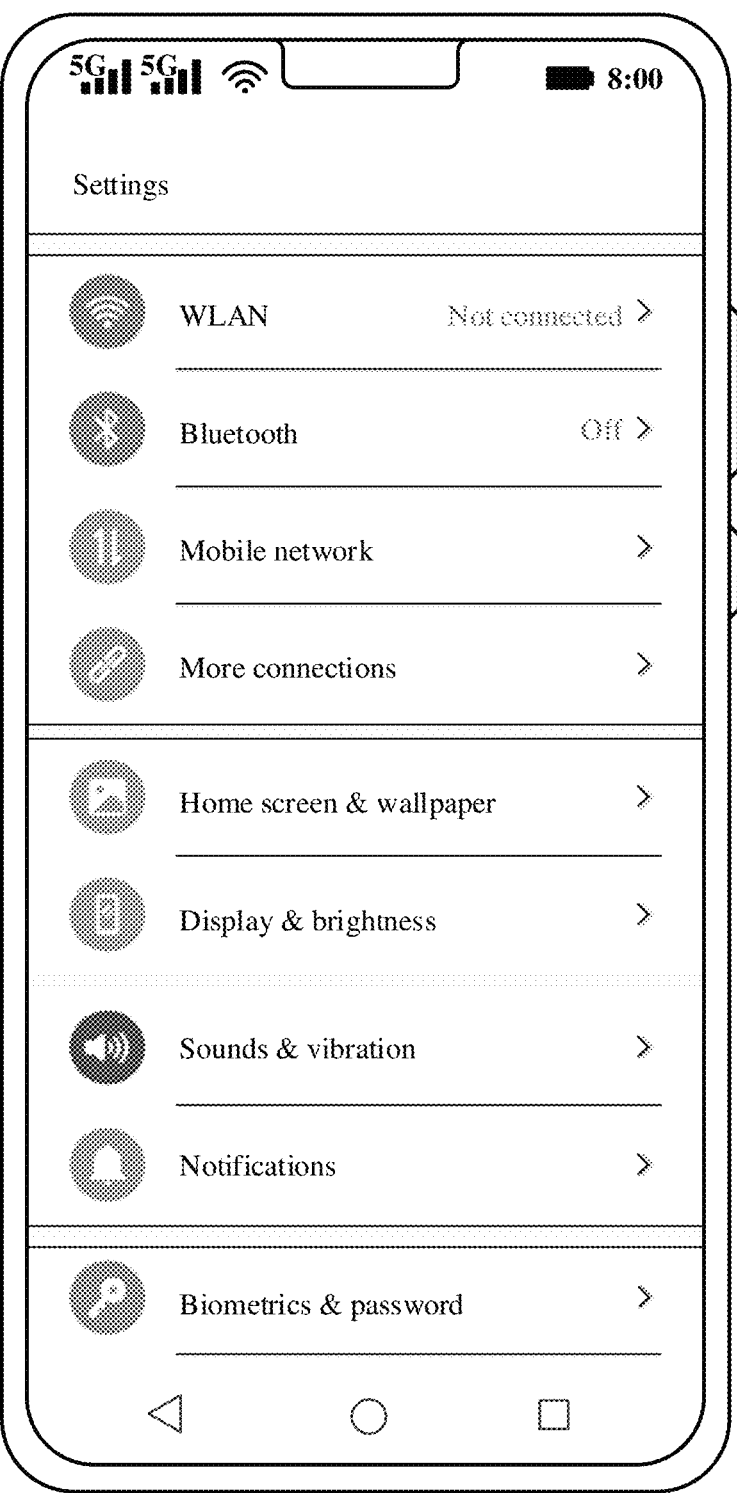
FIG. 4 to FIG. 6(*a*) and FIG. 6(*b*) each are a schematic diagram of an interface according to an embodiment of this application.
Figure 5:
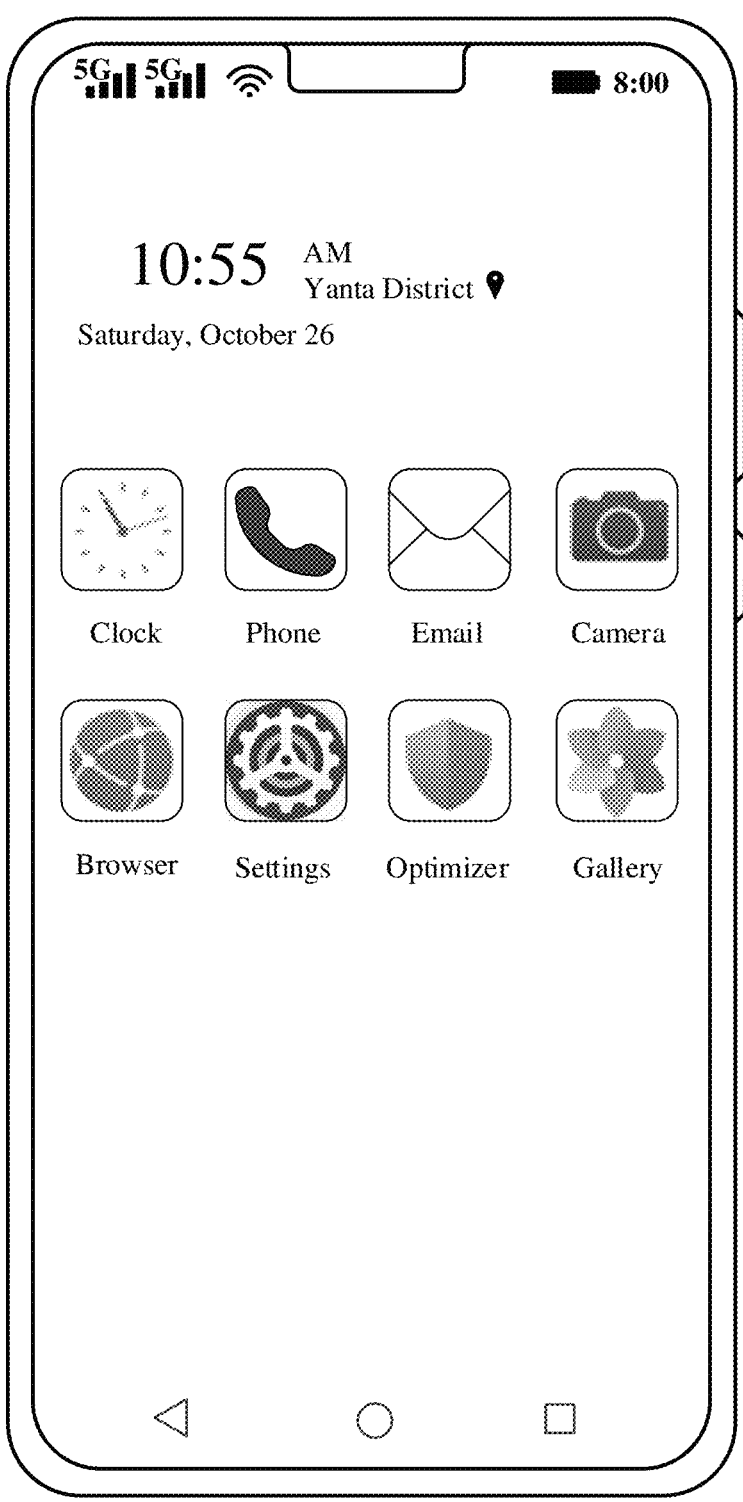

It should be understood that, before screen-off, the electronic device may be running an application in the foreground, for example, using a setting function, playing a video, or using WeChat. The interface displays the application in the running state. FIG. 4 shows an example in which the interface displays the setting function that is enabled. Alternatively, before screen-off, the electronic device may not start an application. The interface displays a desktop icon. FIG. 5 shows an example in which the interface displays desktop icons in a portrait display state.

The framework layer may determine, by interacting with an application layer, whether the interface used before screen-off is a running interface of the application or an interface of the desktop icon; and then may perform layout loading, and perform interface drawing based on an interface obtained after the layout loading. For example, an interface obtained through the interface drawing this time is denoted as an interface 1. An interface shown in FIG. 6(*a*) is an example of an interface displayed in a portrait upright orientation.

Step 304: The framework layer obtains, from the kernel layer, data collected by a sensor.

For example, the framework layer may send an instruction to a sensor service at the kernel layer, to instruct the sensor service to control the sensor to collect the data.

As described above, the electronic device may include an acceleration sensor. The acceleration sensor may be configured to identify a posture of the electronic device.

In a possible implementation, a gravity sensor may report detected data to the sensor service at the kernel layer in real time. The sensor service at the kernel layer may determine a screen orientation of the electronic device based on the data reported by the gravity sensor.

For example, data for calculating the screen orientation may be a gravity acceleration collected by the gravity sensor, and may specifically include components of the gravity acceleration on the x-axis, the y-axis, and the z-axis of the electronic device. The components of the gravity acceleration on the x-axis, the y-axis, and the z-axis of the electronic device may be referred to as accelerations in directions of the x-axis, the y-axis, and the z-axis of the electronic device respectively.

Figure 7:
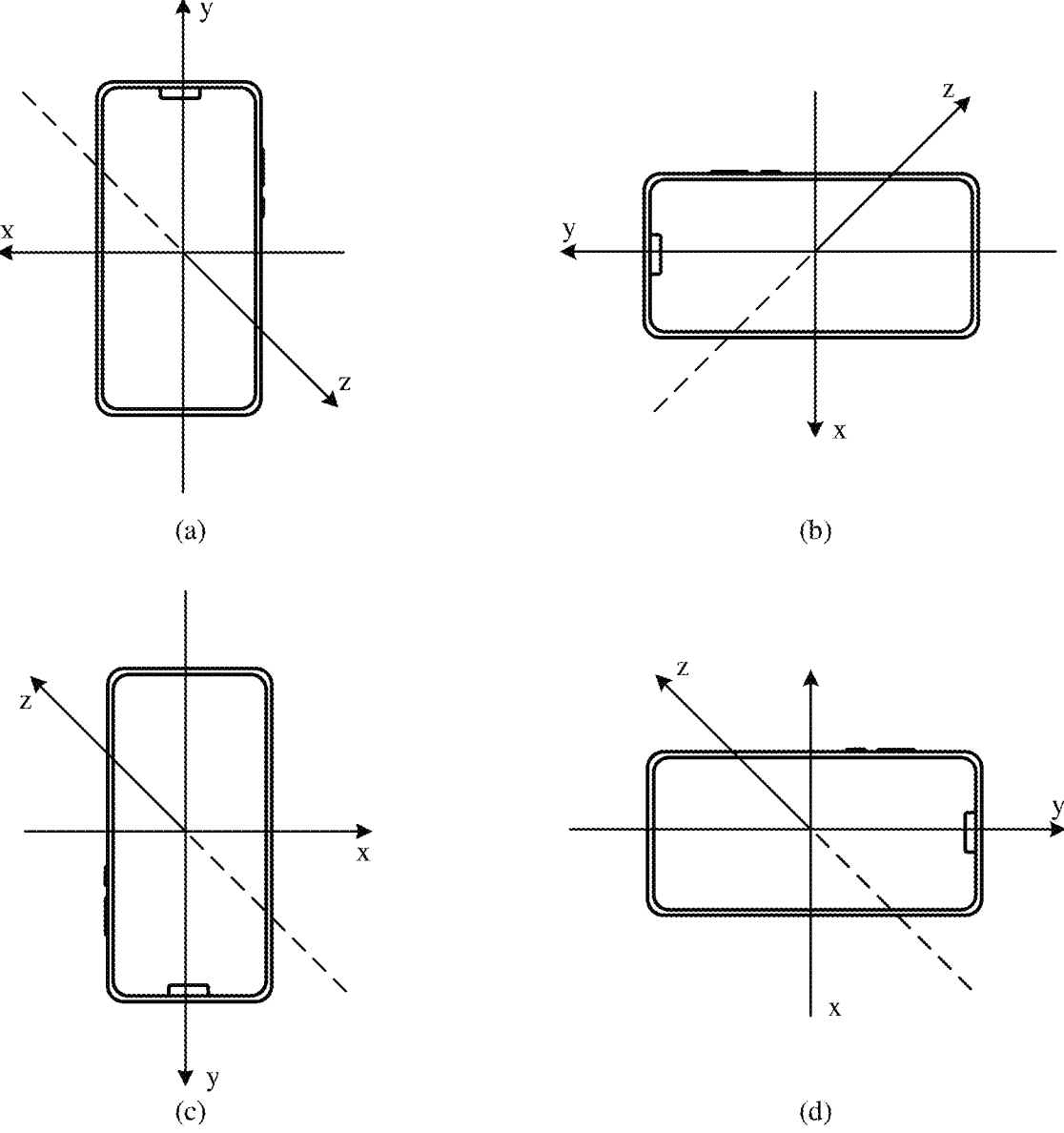
FIG. 7 shows directions of the x-axis, the y-axis, and the z-axis of an electronic device according to an embodiment of this application.

FIG. 7 shows directions of the x-axis, the y-axis, and the z-axis of the electronic device. (a), (b), (c), and (d) in FIG. 7 show the directions of the x-axis, the y-axis, and the z-axis of the electronic device whose screen faces the user and uses different orientations for display. A center of the electronic device is used as a coordinate center. (a) in FIG. 7 shows a portrait upright orientation, namely, a normal hand holding orientation. The x-axis may be a horizontal left direction of the electronic device. The direction of the y-axis may be a vertical upward direction of the electronic device. The direction of the z-axis may be an orientation of the screen of the electronic device, where the screen faces upward. (b) in FIG. 7 shows a landscape left orientation, namely, an orientation obtained by rotating the normal hand holding orientation 90° counterclockwise. (c) in FIG. 7 shows a portrait upside-down orientation, namely, an upside-down direction in which the electronic device is held. (d) in FIG. 7 shows a landscape right orientation, namely, an orientation obtained by rotating the normal hand holding orientation 90° clockwise. It may be understood that, as the electronic device is flipped or rotated, the directions of the x-axis, the y-axis, and the z-axis relative to the electronic device remain unchanged, but an x-axis value, a y-axis value, and a z-axis value that are detected by the gravity sensor may change.

Step 305: The framework layer calculates the screen orientation of the electronic device based on data reported by the kernel layer.

The framework layer may specifically calculate a vector based on the accelerations, in the directions of the x-axis, the y-axis, and the z-axis, reported by the sensor service at the kernel layer, where the vector satisfies $r=\sqrt{x^2+y^2+z^2}$. Then, an included angle $\alpha$ between the direction of the x-axis and the vector r may be further calculated. For example, the included angle between the direction of the x-axis and the vector r may be calculated by using an arcsine function, as shown in the following formula:

$$\alpha = \arcsin\left(\frac{x}{\sqrt{x^2 + y^2 + z^2}}\right) * \left(\frac{180}{\pi}\right)$$

The screen orientation of the electronic device may be determined based on the included angle $\alpha$ obtained through calculation. For a correspondence between a range of the included angle $\alpha$ and the screen orientation of the electronic device, refer to Table 1.

TABLE 1

| Range of an included angle $\alpha$ (unit: degree) | Orientation |
| --- | --- |
| 0-45 and 315-360 | Portrait upright |
| 45-135 | Landscape left |

TABLE 1-continued

| Range of an included angle α (unit: degree) | Orientation |
|---|---|
| 135-225 | Portrait upside-down |
| 225-315 | Landscape right |

Screen rotation performed by a common user usually triggers a shake. Consequently, data of the sensor fluctuates. The sensor may perform calculation based on data that is reported for a plurality of times and that stabilizes within a specific range of an angle, to determine the screen orientation.

Specifically, the framework layer may calculate the included angle α based on data (which may specifically include the accelerations of the electronic device in the directions of the x-axis, the y-axis, and the z-axis) reported by the sensor service each time. If included angles α obtained through a plurality of times of calculation performed by the framework layer based on data reported by the sensor service for a plurality of times each fall within a range in Table 1, it may be determined that an orientation corresponding to the range is the screen orientation of the electronic device.

For example, the angles obtained through the plurality of calculations performed by the framework layer based on the data reported by the sensor service for the plurality of times each are between 45 degrees and 135 degrees. Therefore, it may be determined that the screen orientation of the electronic device is landscape left.

It should be understood that, merely for ease of understanding, the foregoing uses the included angle between the direction of the x-axis and the vector r as an example to describe a specific implementation in which the kernel layer determines the screen orientation. However, this should not constitute any limitation on this application. Based on a same principle, the kernel layer may alternatively determine the screen orientation based on an included angle between the direction of the y-axis and the vector r, but a corresponding angle may be adjusted accordingly.

Step 306: When the framework layer determines that the screen of the electronic device is rotated, the framework layer performs layout loading and interface drawing again.

The framework layer may determine, based on the screen orientation that is of the electronic device and that is determined in step 305 and a screen orientation used before screen-off, that the screen of the electronic device is rotated. Then, the framework layer may perform layout loading and interface drawing again based on the screen orientation obtained through calculation.

Figure 6A:
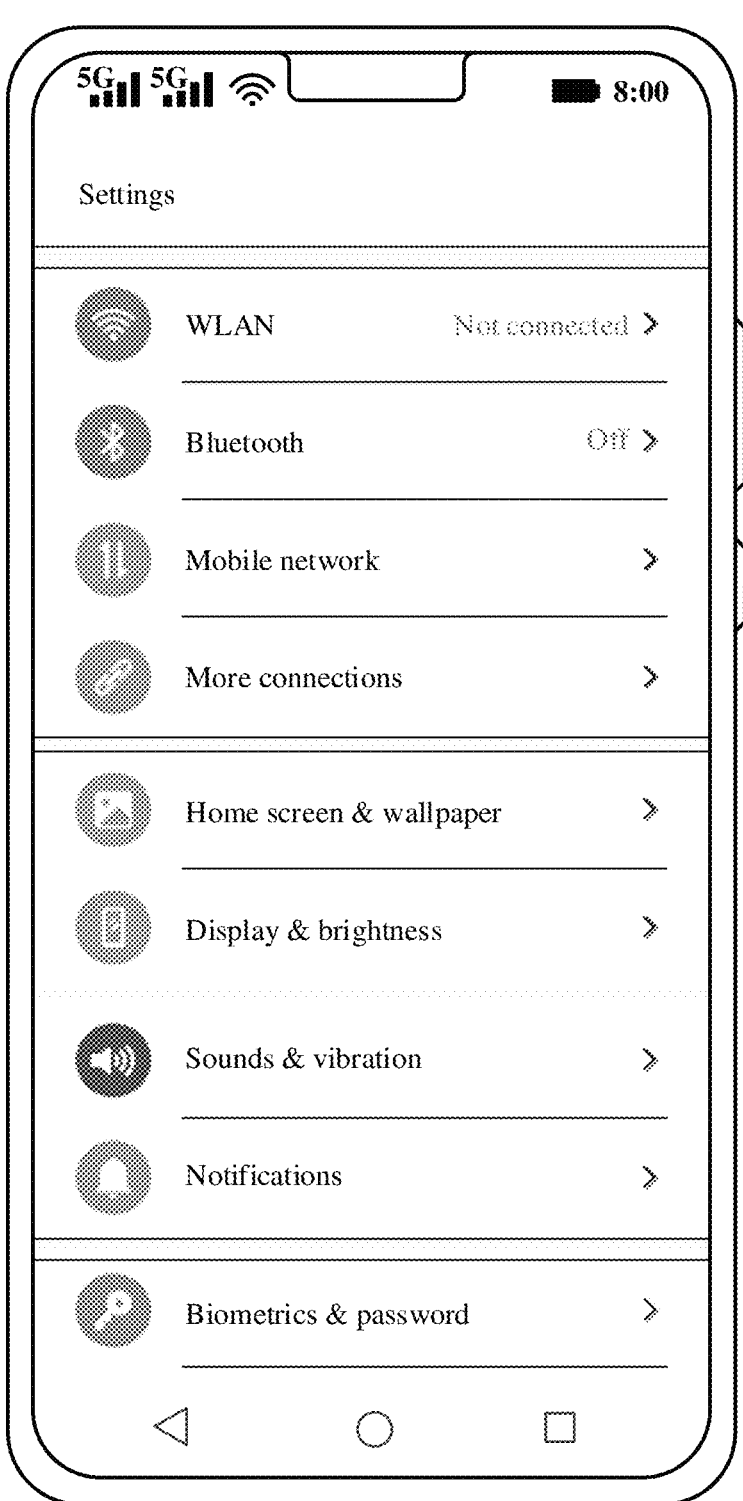
Figure 6B:
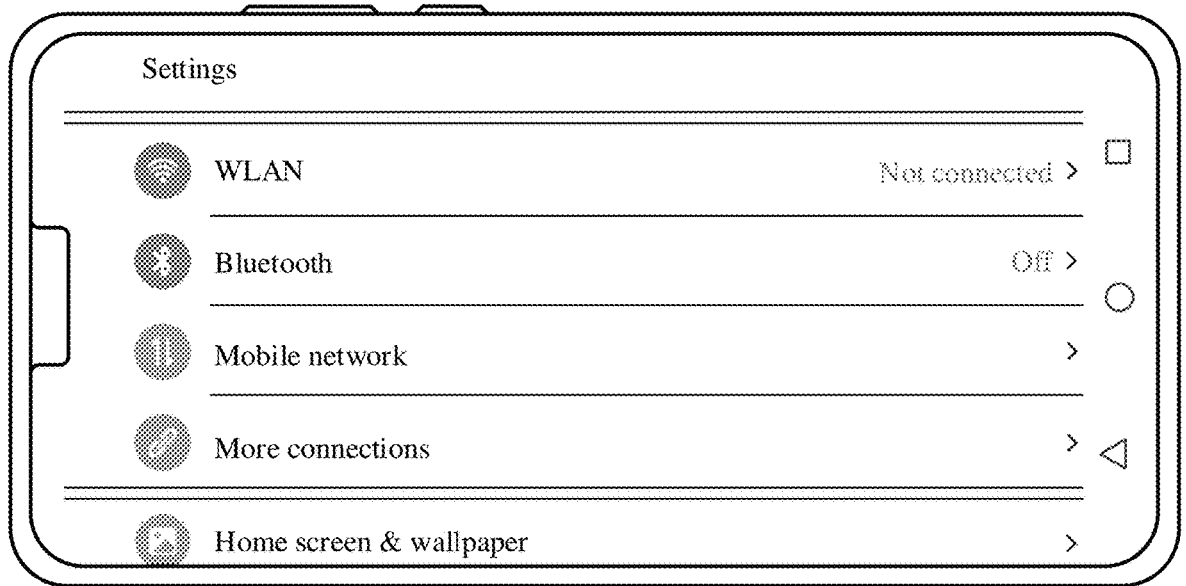

The framework layer may perform the layout loading based on the screen orientation obtained through calculation. For example, the framework layer may complete layout loading by interacting with a lock screen application, and perform, through a drawing service, interface drawing after layout loading is completed. For example, an interface obtained through the interface drawing is denoted as an interface 2. An interface 2 shown by FIG. 6(b) is an example of an interface displayed in a landscape left orientation.

Step 307: The framework layer loads an animation.

The framework layer may load the animation based on the interface 1 used before screen-off and the interface 2 used after screen rotation. The animation is used to implement transition from the interface 1 to the interface 2.

Step 308: The framework layer plays the animation.

The framework layer sends the loaded animation to a display service at the kernel layer, so that the display service controls a display screen to play the animation. In a possible implementation, the framework layer may convert the animation into a series of instruction sets, and send instructions to the display service in chronological order. The display service performs operations such as panning, rotation, and zooming in the display interface based on the instructions.

Based on the foregoing steps, the electronic device may switch the screen from the interface 1 to the interface 2 after screen-on, and then may switch a focus to a new interface, namely, the interface 2.

However, the procedure for layout loading for the interface used before screen-off of the electronic device may take approximately 100 milliseconds (ms). Sampling performed by the sensor of the electronic device takes approximately 66.7 ms. Screen orientation calculation takes 130 ms to 200 ms. After the electronic device determines that the screen is rotated, the procedure in which the electronic device performs layout loading for the interface used after screen rotation and performs interface drawing may also take approximately 100 ms. In the procedure in which the electronic device loads and plays the rotation animation, rotation animation loading takes approximately 40 ms, and animation playing takes approximately 300 ms.

It can be learned that, in response to a screen wakeup operation performed by the user, the electronic device undergoes the two procedures for layout loading and interface drawing, the procedure for a plurality of sensor samplings, the procedure for screen orientation calculation, the procedure for screen rotation animation loading and playing. An entire process takes 606.7 ms to 676.7 ms. In this period, the user cannot perform a screen operation. In other words, the user needs to wait for a long time before performing a screen operation. This results in poor user experience.

On this basis, this application provides an interface display method. After a screen-on operation performed by a user is detected, layout loading and interface displaying for an interface used before screen-off are not immediately performed, but layout loading and interface displaying after screen rotation are directly drawn based on data reported by a sensor. Therefore, a procedure for layout loading for an interface used before screen-off, and interface drawing, and a procedure for screen rotation animation loading and playing can be cut. This greatly reduces waiting time of a user.

The following describes in detail the interface display method provided in embodiments of this application with reference to the accompanying drawings.

It should be understood that the interface display method provided in embodiments of this application applies to not only a case in which a screen orientation of an electronic device is changed, but also a case in which the screen orientation of the electronic device is not changed. For ease of understanding and description, the following uses a scenario in which a screen of the electronic device switches from a first orientation used before screen-off to a second orientation used during wakeup as an example for description. However, this shall not constitute any limitation on this application.

Figure 8:
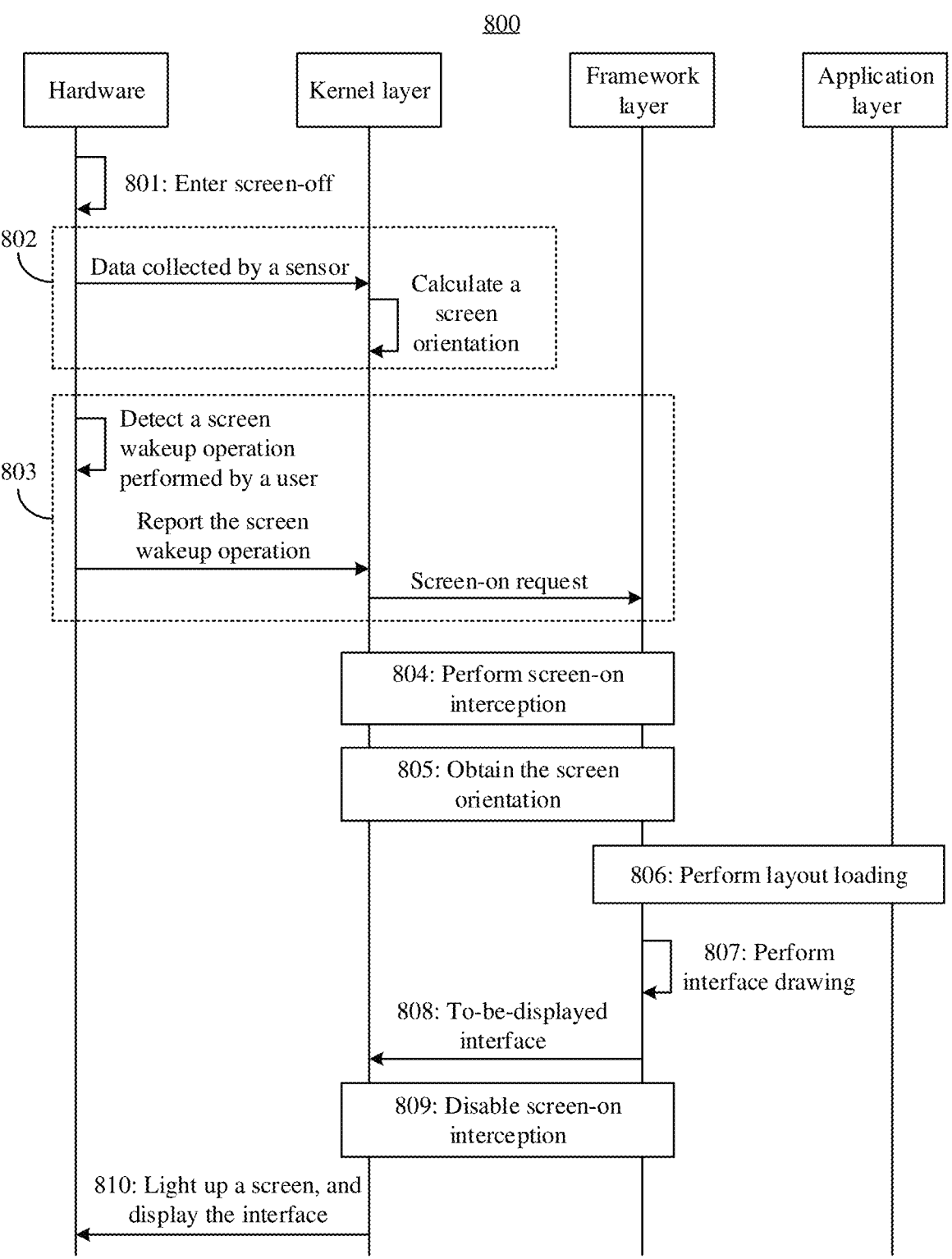
FIG. 8 to FIG. 10 each are a schematic flowchart of an interface display method according to an embodiment of this application.
Figure 9:
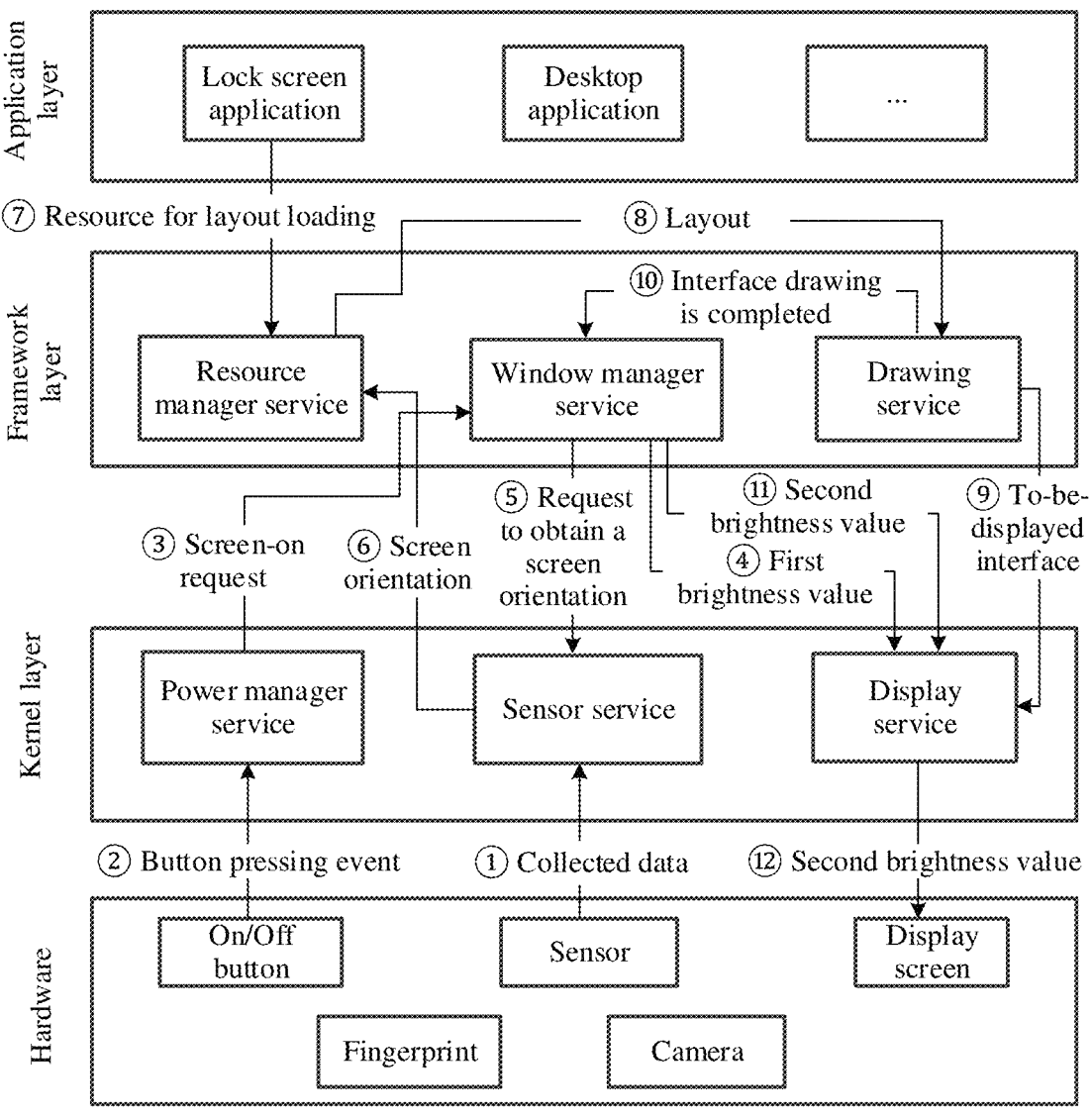

FIG. 8 is a schematic flowchart of an interface display method 800 according to an embodiment of this application. FIG. 9 further shows the interface display method provided in embodiments of this application from a perspective of interaction between modules at layers of an electronic device. The following describes steps in the method 800 in detail with reference to FIG. 8 and FIG. 9.

As shown in FIG. 8, the method 800 may include step 801 to step 810. The following describes the steps in the method

800 in detail. Reference numerals ① to ⑫ in FIG. 9 show interaction information of the modules at the layers.

Step 801: When a screen orientation of the electronic device is a first orientation, enter screen-off.

The electronic device may enter screen-off based on different trigger conditions.

In a possible case, a user performs a screen-off operation to trigger the electronic device to enter screen-off. In this case, step 801 may specifically include: When the screen orientation of the electronic device is the first orientation, the electronic device detects the screen-off operation performed by the user on the electronic device, and enters screen-off in response to the screen-off operation.

The user may perform different operations to turn off a screen, so that the screen enters an off state. For example, the user may press a power on/off button to turn off the screen. For another example, the user may tap a "lock screen" application on a desktop to turn off the screen. When the electronic device detects the screen-off operation performed by the user on the electronic device, the screen enters the off state in response to the screen-off operation.

In another possible case, the user performs no operation on the electronic device for a long time; or for a long time, the electronic device detects no operation performed by the user. The electronic device is in a standby state. When standby time of the electronic device reaches a preset threshold, the electronic device may automatically enter screen-off. The preset threshold may be user-defined, and the user may set the preset threshold by using a setting function. For example, the preset threshold may be 15 seconds, 30 seconds, or one minute. This is not limited in this embodiment of this application.

It may be understood that before the electronic device enters screen-off, an interface displayed on the screen adapts to the screen orientation. For example, the screen of the electronic device is in the first orientation before the screen enters the off state. The interface displayed on the screen before the electronic device enters an off state is an interface that adapts to the first orientation. For example, the first orientation may be the foregoing portrait upright orientation as shown in FIG. 6(*a*).

Step 802: A kernel layer determines a screen orientation based on data reported by a sensor in real time.

In this embodiment, although the screen enters the off state, a sensor service at the kernel layer may control the sensor (for example, a gravity sensor) to collect and report the data in real time. As shown by ① in FIG. 9, the sensor reports the collected data to the sensor service. As described above, data reported by the gravity sensor includes gravity accelerations of the electronic device in directions of the x-axis, the y-axis, and the z-axis.

The sensor service at the kernel layer may calculate the screen orientation in real time based on the data reported by the sensor.

For example, for a specific method for calculating the screen orientation by the sensor service, refer to the foregoing related description in step 304. A difference is that in this embodiment, the kernel layer may calculate the screen orientation based on the data reported by the sensor.

Optionally, the kernel layer may store the screen orientation obtained through calculation in a local memory instead of actively reporting the screen orientation to the framework layer, to avoid waking up the framework layer and causing unnecessary power consumption. After the kernel layer receives a request from the framework layer, the kernel layer may report, to the framework layer, a screen orientation obtained through latest calculation or a plurality of times of calculation, so that the framework layer can accurately obtain a correct screen orientation.

Herein, the correct screen orientation may be specifically a current real screen orientation. For example, in this embodiment, the sensor service calculates the screen orientation in real time, and a screen orientation obtained through each calculation is a current screen orientation, namely, a correct screen orientation.

It should be understood that a method for determining a screen orientation is not limited to the method provided in this application, and the kernel layer may alternatively determine the screen orientation in another existing manner. A specific manner of determining the screen orientation is not limited in this application.

It should be further understood that the figure is merely an example. Step 802 shows a process in which the sensor reports the collected data to the kernel layer and the kernel layer calculates the screen orientation. Actually, step 802 may be performed continuously instead of being performed only before step 803. In addition, step 802 may be performed for a plurality of times instead of being performed only once. The example in the figure shall not constitute any limitation on this embodiment of this application. Step 803: When the screen orientation of the electronic device switches to a second orientation, a screen wakeup operation performed by the user on the electronic device is detected, and the kernel layer sends a screen-on request to the framework layer in response to the screen wakeup operation performed by the user.

As described above, the user may perform various operations to wake up the screen. Based on operations performed by the user on different pieces of hardware, each piece of hardware in the electronic device may report the operation performed by the user to the sensor service at the kernel layer, in response to the screen wakeup operation of the user. When the kernel layer determines that the operation performed by the user is to wake up the screen, the kernel layer may further send the screen-on request to a window manager service at the framework layer, to request the window manager service to prepare for screen-on.

For example, as described above, the user may press a power on/off button to wake up the screen. When the user presses an on/off button (or referred to as a power on/off button or a power button) in FIG. 9, the button pressing event is reported to a power manager service at the kernel layer in response to the operation performed by the user. As shown by ② in FIG. 9, the power on/off button reports the button pressing event to the power manager service. The power manager service may determine, based on the button pressing event, that the user expects to wake up the screen, and therefore may further report to the window manager service at the framework layer, to send the screen-on request. As shown by ③ in FIG. 9, the power manager service sends the screen-on request to the window manager service.

For another example, the user may wake up the screen in a manner such as fingerprint recognition or protective case opening. Based on different operations performed by the user, after related hardware detects the operation performed by the user, the related hardware may report the operation performed by the user to the kernel layer. Then, the kernel layer sends the screen-on request to the framework layer.

Step 804: The framework layer performs screen-on interception.

Usually, after the window manager service receives the screen-on request, the window manager service at the framework layer may perform the following operations. First, the window manager service may update a power state of a component related to screen display. For example, the window manager service updates the power state from "off" to "on". Next, window service management may power on the screen (for example, an LCD). Powering on the screen may be specifically powering on the component related to screen display. A window service may further calculate backlight brightness based on an interface displayed before screen-off of the electronic device. Then, the window manager service may send the backlight brightness to a display service at the kernel layer, and send the backlight brightness to a display screen through the display service. The display screen may adjust brightness of a backlight panel based on the backlight brightness from the display service. It should be understood that the backlight brightness may be used to provide a light source for a display panel, to light up the screen for display.

However, in this embodiment, after the window manager service receives the screen-on request, the window manager service may temporarily perform screen-on interception. Screen-on interception may specifically mean that after the window manager service receives the screen-on request, the window manager service temporarily does not respond to the screen-on request, to delay screen-on. In this embodiment, the framework layer does not perform, based on the screen wakeup operation performed by the user, layout loading for the interface used before screen-off, or screen drawing. Therefore, if screen-on interception is not performed, no content may be displayed after the screen is lit up, and a splash screen may appear.

For example, the window manager service may temporarily not calculate the backlight brightness, or may temporarily not send the actually required backlight brightness obtained through calculation to the display service.

In an implementation, the window manager service may notify the display service that the backlight brightness is a first brightness value, as shown by ④ in FIG. 9. For example, the first brightness value may be 0 or a small value. When the backlight panel is set to the first brightness value, the backlight panel basically does not emit light. Herein, that the backlight panel basically does not emit light may be specifically: A brightness value of the backlight panel is 0, and no light source is provided; or a brightness value of the backlight panel is close to 0, light is very weak, and no sufficient light source can be provided for the screen to normally display an interface. In other words, when the backlight panel is set to the first brightness value, the backlight panel cannot provide the screen with a light source for normal display. Consequently, the screen cannot normally display the interface, and the user cannot see the interface. For the user, when the backlight brightness of the backlight panel is set to the first brightness value, the screen is dimmed. In this way, screen-on interception is implemented, and the screen cannot be immediately lit up based on the wakeup operation performed by the user.

When the backlight brightness is the first brightness value, the display service may send, to the display screen, an instruction indicating that the backlight brightness is the first brightness value, so that the display screen controls the backlight brightness to be the first brightness value. In other words, the backlight panel cannot provide a sufficient light source for the screen to normally display the interface. In another implementation, the window manager service may not notify the display service of the backlight brightness, so that adjustment of the backlight brightness is delayed. In a screen-off state, the backlight panel does not provide a light source for the screen. Therefore, the screen cannot display an image. When no instruction indicating the backlight brightness is received, the backlight panel may continue to remain in a screen-off state. In this way, screen-on interception can be implemented, and the screen cannot be immediately lit up based on the wakeup operation performed by the user.

It should be understood that, the first brightness value is not specifically limited in this embodiment of this application, and shall fall within the protection scope of this application provided that the backlight brightness is set to temporarily prevent the backlight panel from emitting light.

It should be further understood that setting the backlight brightness to the first brightness value to prevent the backlight panel from emitting light is a possible manner of implementing screen-on interception. If there is another manner of implementing screen-on interception, the another manner may also be applied to the method provided in this embodiment of this application. This is not limited in this embodiment of this application.

Step 805: The framework layer obtains the screen orientation from the kernel layer.

It has been noted in step 802 that the sensor service may calculate the screen orientation of the electronic device in real time. For example, the window manager service at the framework layer may send, based on the screen-on request in step 803, a request for the screen orientation to the sensor service at the kernel layer, as shown by ⑤ in FIG. 9.

The sensor service may report the screen orientation obtained through real-time calculation to a resource manager service at the framework layer, as shown by ⑥ in FIG. 9. In a possible implementation, different screen orientations may be indicated by using different identifiers. For example, the four different screen orientations listed in Table 1 may be in a one-to-one correspondence with identifiers shown in Table 2.

TABLE 2

| Identifier | Orientation |
| --- | --- |
| 0 | Portrait upright |
| 1 | Landscape left |
| 2 | Portrait upside-down |
| 3 | Landscape right |

The sensor service and the resource manager service may agree, in advance, on the correspondence between the identifiers and the orientations that is shown in Table 2. After the sensor service determines the screen orientation based on a calculation result, the sensor service may report, to the resource manager service based on the correspondence, an identifier corresponding to the determined screen orientation. The resource manager service may determine a screen orientation based on the correspondence and the received identifier.

It should be understood that, the correspondence between the identifiers and the orientations that is shown in Table 2 is merely an example, and should not constitute any limitation on this application. A specific manner in which the sensor service reports the screen orientation is not limited in this application.

It may be understood that, the screen orientation obtained by the resource manager service is a screen orientation determined based on a latest calculation, or may be a screen orientation determined based on a plurality of latest calculations. An objective of determining the screen orientation based on the plurality of latest calculations is to avoid a possibility that the screen orientation is incorrectly determined due to incorrect calculation caused by a possible shake of the electronic device during screen rotation.

For ease of description, a current screen orientation obtained by the resource manager service is recorded as a correct screen orientation in this specification. The electronic device may be rotated after screen-off, which causes a change in the screen orientation. Alternatively, the electronic device may not be rotated, and the screen orientation remains unchanged. Therefore, the correct screen orientation may be the same as or different from the screen orientation used before screen-off. This is not limited in this embodiment of this application.

Step 806: The framework layer performs layout loading.

The resource manager service at the framework layer may obtain a resource for layout loading from an app layer based on the correct screen orientation. For example, the framework layer may send the screen orientation obtained in step 806 to the app layer, and the app layer may determine, based on the screen orientation, a resource to be loaded, so as to deliver the resource to the resource manager service. The resource manager service may perform layout loading based on the resource obtained from the app layer.

In a possible design, the app layer may locally prestore resources corresponding to different screen orientations. For example, a resource for landscape display is placed in a landscape directory, and a resource for portrait display is placed in a portrait directory. The app layer may deliver a corresponding resource to the framework layer based on a screen orientation indicated by the framework layer.

In addition, screens of electronic products of different models are in different sizes, and therefore the app layer may further prestore resources applicable to electronic devices of different models. The resources applicable to the electronic devices of different models may also be separately stored in directories for different models. After the app layer determines the screen orientation, the app layer may further load a resource based on a model of the electronic device. If the electronic device currently used by the user is not among prestored electronic device models, the app layer may alternatively load a resource based on default settings.

It may be understood that some electronic devices are provided with lock screens, and other electronic devices are not provided with lock screens. A resource loaded by the framework layer and an interface subsequently drawn by the framework layer vary depending on whether a lock screen is provided.

When the electronic device is provided with a lock screen, an interface displayed by the electronic device after screen-on may be the lock screen. Therefore, the resource manager service needs to load a resource for laying out the lock screen. For example, the framework layer may interact with a lock screen application, to obtain a resource for laying out the lock screen and perform layout loading based on the obtained resource, as shown by ⑦ in FIG. 9. The resource for layout loading may include resources such as an image (for example, a lock screen wallpaper) and text.

When the electronic device is not provided with a lock screen, content of the interface displayed by the electronic device after screen-on may be the same as content of the interface displayed by the electronic device before screen-off. However, the screen orientation may be changed. Therefore, the lock screen application may load a layout in accordance with the correct screen orientation based on the content of the interface displayed before screen-off.

If the electronic device runs an application in the foreground before screen-off, the electronic device may obtain, from the application, a resource for layout loading. The resource for layout loading may include resources such as an icon, text, and a background in the application.

If the electronic device does not run an application in the foreground before screen-off, an interface displayed before screen-off is a desktop icon. The electronic device may obtain, from each desktop application, a resource for layout loading. The resource for layout loading may include resources such as an icon of each desktop application, and a desktop background in the application.

Step 807: The framework layer performs interface drawing, to obtain a to-be-displayed interface.

A drawing service at the framework layer may perform interface drawing based on a layout obtained by performing layout loading, to obtain the to-be-displayed interface.

It may be understood that the to-be-displayed interface is an interface suitable for the correct screen orientation, or an interface that can adapt to the screen orientation. For example, in this embodiment, the interface is an interface that adapts to the second orientation. In other words, when the user places the screen of the electronic device in the second orientation, or views the screen at an angle that adapts to the second orientation, the to-be-displayed interface can meet a requirement for normal viewing. For example, if the second orientation is the portrait upright orientation, the interface is also displayed in the portrait orientation upright orientation, as shown in FIG. 6(*a*). For another example, if the second orientation is the landscape left orientation, the interface is also displayed in the landscape left orientation, as shown in FIG. 6(*b*).

Step 808: The framework layer sends the to-be-displayed interface to the kernel layer.

After the drawing service at the framework layer draws the to-be-displayed interface, the drawing service may send the to-be-displayed interface to the display service at the kernel layer as shown by ⑨ in FIG. 9, so that the display service uses the screen to display the to-be-displayed interface.

Step 809: The framework layer disables screen-on interception.

In addition, after the drawing service at the framework layer completes interface drawing, the drawing service may send, to the window manager service, a notification indicating that interface drawing is completed, as shown by ⑩ in FIG. 9. The window manager service may send, based on completion of interface drawing, backlight brightness (for example, denoted as a second brightness value) obtained through calculation to the display service at the kernel layer, as shown by ⑪ in FIG. 9. The window manager service may calculate the backlight brightness based on an application started on the interface used before screen-off, so that the backlight brightness adapts to the to-be-displayed interface. For example, the window manager service may set the backlight brightness based on the backlight brightness used before screen-off.

Herein, the second brightness value may be greater than the first brightness value. The backlight panel may be enabled, by using the second brightness value, to emit light, so that a sufficient light source is provided for the screen. As a result, the screen can normally display an interface, and the user can view the interface on the screen. For the user, when the backlight brightness of the backlight panel is set to the second brightness value, the screen is lit up, and the user can normally view the interface on the screen.

In a possible design, the second brightness value is greater than 0.

After the window manager service sends the backlight brightness to the display service, the display service may further send, to the screen, an instruction indicating the backlight brightness, to control the screen to adjust the brightness of the backlight panel, as shown by ⑫ in FIG. 9. The backlight panel emits light based on the new backlight brightness value, and therefore may provide a light source for the display panel. In this way, screen-on interception can be disabled.

It should be understood that the operation of calculating the backlight brightness by the window manager service may be performed before step 809, for example, may be performed after step 803, or after step 808, or even after screen-off. This is not limited in this embodiment of this application.

It should be further understood that step 809 may be performed after step 808. In this case, the display service may first obtain the to-be-displayed interface before the backlight brightness is adjusted. Then, the to-be-displayed interface can be directly presented after screen-on.

Certainly, step 809 may alternatively be performed before step 808 or at the same as step 808. In this case, the backlight brightness may be adjusted after the display service obtains the to-be-displayed interface, to avoid the splash screen caused by a case in which no content is displayed after screen-on.

Step 810: Light up the screen, and display the to-be-displayed interface.

The screen may adjust the brightness of the backlight panel based on the backlight brightness. The backlight panel emits light to provide the light source for the display panel. In this way, the screen is lit up, is in a screen-on state, and displays the to-be-displayed interface in the screen-on state. As a result, the user can normally view the screen.

Based on the foregoing solution, after screen-off, the electronic device may temporarily not light up, based on the screen wakeup operation performed by the user, the screen for display. The electronic device may first obtain the screen orientation, and perform layout loading and interface drawing based on the screen orientation, to obtain the interface that adapts to the current screen orientation. The electronic device may light up the screen to display the interface after interface drawing is completed. Therefore, after screen-on, the electronic device may alternatively directly display the interface that can adapt to the screen orientation, and the user can directly perform an operation.

Especially in a case in which the screen of the electronic device is rotated after screen-off, when the electronic device detects the screen wakeup operation performed by the user, the electronic device may not perform a procedure for layout loading for the interface used before screen-off, and interface drawing, and a procedure for screen rotation animation loading and playing, and corresponding time can be saved.

In addition, the sensor reports the data in real time. Therefore, the sensor service may calculate the screen orientation in real time. When the electronic device detects the screen wakeup operation performed by the user, the electronic device may directly obtain the screen orientation, and does not need to spend extra time in calculating the screen orientation. Therefore, time for calculating the screen orientation is also saved. Therefore, waiting time is greatly reduced, and user experience is greatly improved.

Even if the screen of the electronic device is not rotated after screen-off, the sensor performs collection and reporting in real time, and the sensor service calculates the screen orientation in real time. As a result, the electronic device can quickly obtain the screen orientation, to load a layout and draw an interface based on the correct screen orientation.

Therefore, the electronic device can still light up, in very short time, the screen for display, and no large delay is caused.

In another implementation, the electronic device may not collect data and calculate the screen orientation in real time. For example, with development of sensor technologies, when a sensor has a high speed of responding to data collection and reporting instructions, the electronic device may alternatively use the sensor with a high speed of responding, to collect and report data. For a specific procedure, refer to the following description with reference to FIG. 10.

Figure 10:
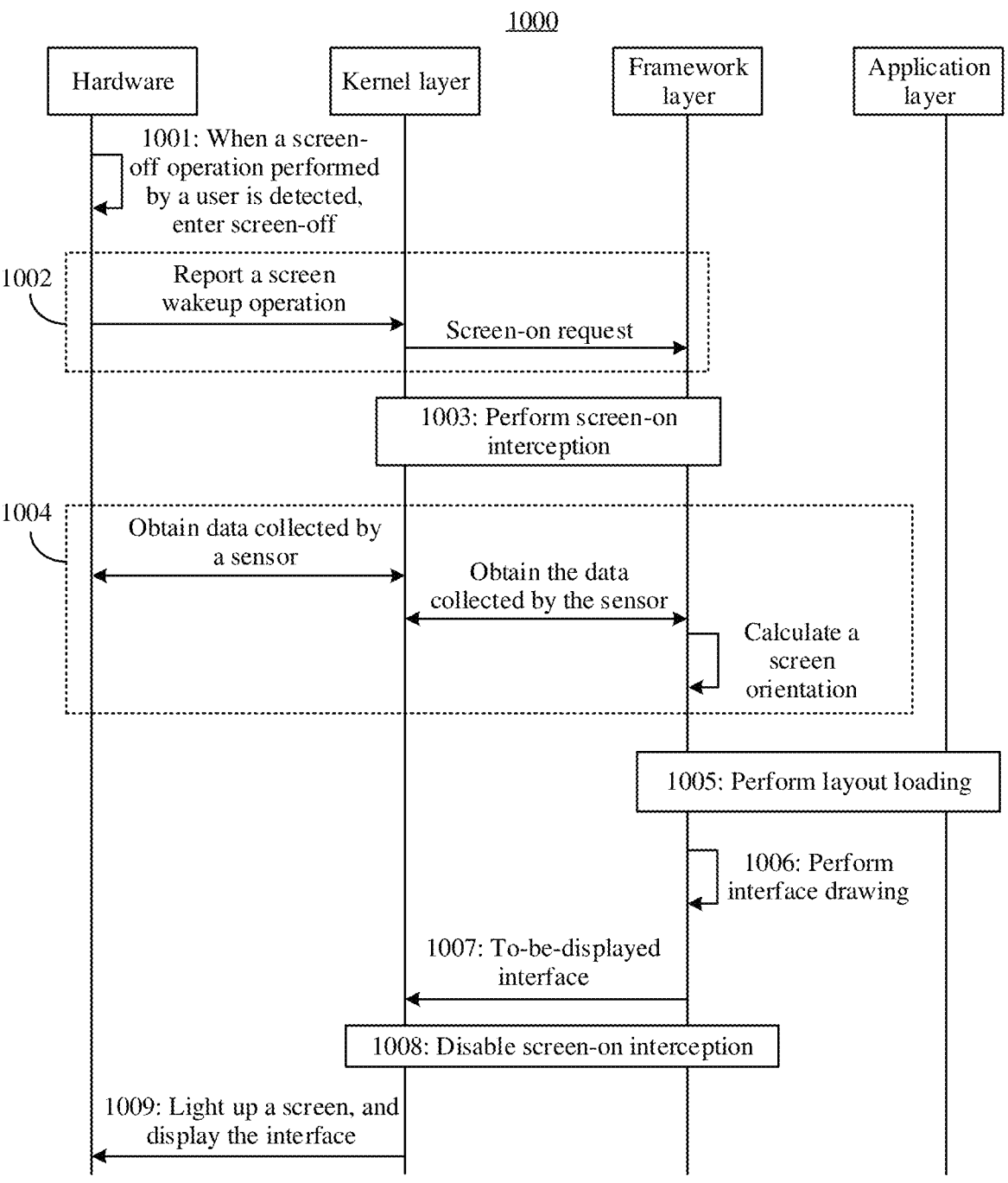

FIG. 10 is another schematic flowchart of an interface display method 1000 according to an embodiment of this application. As shown in FIG. 10, the method 1000 may include step 1001 to step 1009. The following describes the steps in the method 1000 in detail.

Step 1001: When a screen orientation of an electronic device is a first orientation, enter screen-off.

Step 1002: When the screen orientation of the electronic device switches to a second orientation, a screen wakeup operation performed by a user on the electronic device is detected, and a kernel layer sends a screen-on request to a framework layer in response to the screen wakeup operation performed by the user.

Step 1003: The framework layer performs screen-on interception.

It should be understood that, for specific processes of step 1001 to step 1003, refer to the foregoing related descriptions of step 801, step 803, and step 804 in the method 800. For brevity, details are not described herein again.

Step 1004: The framework layer calculates a screen orientation based on data reported by a sensor.

In an implementation, a window manager service at the framework layer may send a data obtaining request to a sensor service at the kernel layer, to obtain the data from the sensor through the sensor service. Based on the request of the window manager service, the sensor service obtains the data from the sensor and reports the data to the window manager service. The window manager service may calculate the screen orientation by itself based on the data reported by the sensor.

A specific method for calculating the screen orientation by the window manager service may be the same as the foregoing specific method for calculating the screen orientation by the sensor service. This is not limited in this embodiment of this application.

In addition, the foregoing specific procedure in which window service management obtains the collected data from the sensor is merely an example. This is not limited in this embodiment of this application.

In this embodiment, a sensor with a high speed of responding is used, and it is estimated that data collection and reporting, and screen orientation calculation may be completed within 10 ms. Therefore, step 802 in the method 800 may not be performed constantly, where in step 802, the sensor collects and reports data in real time, and the sensor service keeps calculating the screen orientation in the background. As a result, power consumption can be reduced.

Step 1005: The framework layer performs layout loading.

Step 1006: The framework layer performs interface drawing, to obtain a to-be-displayed interface.

Step 1007: The framework layer sends the to-be-displayed interface to the kernel layer.

Step 1008: The framework layer disables screen-on interception.

Step 1009: Light up a screen, and display the to-be-displayed interface.

It should be understood that, for specific processes of step 1005 to step 1009, refer to the foregoing related descriptions of step 806 to step 810 in the method 800. For brevity, details are not described herein again.

Based on the foregoing solution, after screen-off, the electronic device may temporarily not light up, based on the screen wakeup operation performed by the user, the screen for display. The electronic device may first obtain the screen orientation, and perform layout loading and interface drawing based on the screen orientation, to obtain an interface that adapts to the current screen orientation. The electronic device may light up the screen to display the interface after interface drawing is completed. Therefore, after screen-on, the electronic device may alternatively directly display the interface that can adapt to the screen orientation, and the user can directly perform an operation.

Especially in a case in which the screen of the electronic device is rotated after screen-off, when the electronic device detects the screen wakeup operation performed by the user, the electronic device may not perform a procedure for layout loading for an interface used before screen-off, and interface drawing, and a procedure for screen rotation animation loading and playing, and corresponding time can be saved.

In addition, the sensor can collect and report data in short time. Therefore, the sensor does not need to collect data in real time in the background, and the sensor service does not need to calculate the screen orientation in real time in the background. As a result, power consumption can be greatly reduced. Moreover, because the sensor responds at a high speed, the framework layer can obtain the screen orientation in very short time, and no large delay for screen-on is caused. Therefore, the user can perform an operation after screen-on, waiting time is greatly reduced, and user experience is greatly improved.

Even if the screen of the electronic device is not rotated after screen-off, the sensor responds at a high speed. As a result, the electronic device can quickly obtain the screen orientation, to load a layout and draw an interface based on the correct screen orientation. Therefore, the electronic device can still light up, in very short time, the screen for display, and no large delay is caused.

It should be understood that the sequence numbers of the processes in the foregoing embodiments do not mean an execution order. The execution order of the processes should be determined based on functions and internal logic of the processes, and should not be construed as any limitation on the implementation processes of the embodiments of this application. For example, step 805 and step 804 in the method 800 may be performed simultaneously, and step 1003 and step 1004 in the method 1000 may also be performed simultaneously.

It should be understood that the steps of the foregoing methods may be completed by using a hardware integrated logic circuit in a processor or by using instructions in a form of software. The steps of the methods disclosed with reference to embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

This application further provides an electronic device. The electronic device may include a memory and a processor. The memory may be configured to store a computer program. The processor may be configured to invoke the computer program in the memory, so that the electronic device performs the method in any one of the embodiment shown in FIG. 8 or the embodiment shown in FIG. 10.

This application further provides a computer program product. The computer program product includes a computer program (which may also be referred to as code or instructions). When the computer program is run, an electronic device is enabled to perform the method in any one of the embodiment shown in FIG. 8 or the embodiment shown in FIG. 10.

This application further provides a computer-readable storage medium. The computer-readable storage medium stores a computer program (which may also be referred to as code or instructions). When the computer program is run, an electronic device is enabled to perform the method in any one of the embodiment shown in FIG. 8 or the embodiment shown in FIG. 10.

It should be understood that the processor in embodiments of this application may be an integrated circuit chip and has a signal processing capability. During implementation, the steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or may be performed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and methods described in this specification includes but is not limited to these and any memory of another appropriate type.

The terms such as "unit" and "module" used in this specification may be used to indicate computer-related entities, hardware, firmware, combinations of hardware and software, software, or software being executed.

A person of ordinary skill in the art may be aware that, the illustrative logical blocks and steps described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, the functional units in embodiments of this application may be integrated into one processing unit, or each of the units may exist alone physically, or two or more units may be integrated into one unit.

In the foregoing embodiments, all or some of the functions of the functional units may be implemented by using software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interface display method, comprising:
performing a screen-on interception in response to a screen wakeup operation performed by a user on an electronic device while a screen is in an off state, wherein performing the screen-on interception comprises preventing the screen from being lit up, and the screen is not lit up when the screen is in the off state;
drawing a to-be-displayed interface adapted to a screen orientation of the electronic device while performing the screen-on interception;
disabling the screen-on interception for the screen after drawing the to-be-displayed interface; and
displaying the to-be-displayed interface based on the screen orientation after disabling the screen-on interception.

2. The method according to claim 1, wherein the method further comprises:
before performing the screen-on interception in response to the screen wakeup operation performed by the user on the electronic device, entering screen-off when the screen orientation of the electronic device is a first orientation, wherein entering screen-off comprises placing the screen in the off state.

3. The method according to claim 2, wherein entering screen-off when the screen orientation of the electronic device is the first orientation comprises:
when the screen orientation of the electronic device is the first orientation,
detecting a screen-off operation performed by the user on the electronic device, and
entering screen-off in response to the screen-off operation performed by the user on the electronic device.

4. The method according to claim 2, wherein the method further comprises:

when the screen orientation of the electronic device switches to a second orientation, detecting the screen wakeup operation performed by the user on the electronic device.

5. The method according to claim 4, wherein the first orientation is a portrait orientation, and the second orientation is a landscape orientation.

6. The method according to claim 1, further comprising obtaining the screen orientation of the electronic device before drawing the to-be-displayed interface that adapts to the screen orientation.

7. The method according to claim 6, wherein obtaining the screen orientation of the electronic device comprises:

collecting data in real time through a sensor; and calculating the screen orientation based on the collected data.

8. The method according to claim 7, wherein the sensor is a gravity sensor.

9. The method according to claim 1, wherein performing the screen-on interception on the screen comprises:

setting, to a first brightness value, backlight brightness of a backlight panel configured to provide a light source for the screen, so that the screen is dimmed.

10. The method according to claim 9, wherein disabling the screen-on interception for the screen comprises:

setting the backlight brightness of the backlight panel to a second brightness value, so that the screen is lit up, wherein the second brightness value is greater than the first brightness value.

11. The method according to claim 1, wherein:

drawing the to-be-displayed interface is performed by a drawing service at a framework layer; and displaying the to-be-displayed interface is performed by a display service at a kernel layer.

12. An electronic device, comprising:

a processor; and a non-transitory computer readable medium which contains computer-executable instructions, wherein the processor is configured to execute the computer-executable instructions to enable the electronic device to perform operations comprising:

performing a screen-on interception in response to a screen wakeup operation performed by a user on the electronic device while a screen is in an off state, wherein performing the screen-on interception comprises preventing the screen from being lit up, and the screen is not lit up when the screen is in the off state, drawing a to-be-displayed interface adapted to a screen orientation of the electronic device while performing the screen-on interception, disabling the screen-on interception for the screen after drawing the to-be-displayed interface, and displaying the to-be-displayed interface based on the screen orientation after disabling the screen-on interception.

13. The electronic device according to claim 12, wherein the computer-executable instructions further enable the electronic device to perform operations comprising:

before performing the screen-on interception in response to the screen wakeup operation performed by the user on the electronic device, entering screen-off when the screen orientation of the electronic device is a first orientation, wherein entering screen-off comprises placing the screen in the off state.

14. The electronic device according to claim 13, wherein entering screen-off when the screen orientation of the electronic device is the first orientation comprises:

when the screen orientation of the electronic device is the first orientation, detecting a screen-off operation performed by the user on the electronic device, and entering screen-off in response to the screen-off operation performed by the user on the electronic device.

15. The electronic device according to claim 13, wherein the computer-executable instructions further enable the electronic device to perform operations comprising:

when the screen orientation of the electronic device switches to a second orientation, detecting the screen wakeup operation performed by the user on the electronic device.

16. The electronic device according to claim 12, wherein the computer-executable instructions further enable the electronic device to perform operations comprising:

obtaining the screen orientation of the electronic device before drawing the to-be-displayed interface that adapts to the screen orientation.

17. The electronic device according to claim 16, wherein obtaining the screen orientation of the electronic device comprises:

collecting data in real time through a sensor; and calculating the screen orientation based on the collected data.

18. The electronic device according to claim 17, wherein the sensor is a gravity sensor.

19. The electronic device according to claim 12, wherein performing the screen-on interception on the screen comprises:

setting, to a first brightness value, backlight brightness of a backlight panel configured to provide a light source for the screen, so that the screen is dimmed.

20. The electronic device according to claim 19, wherein disabling the screen-on interception for the screen comprises:

setting the backlight brightness of the backlight panel to a second brightness value, so that the screen is lit up, wherein the second brightness value is greater than the first brightness value.

21. A non-transitory computer-readable storage medium, wherein the non-transitory computer-readable storage medium stores a computer program, and when the computer program is executed by a processor, an electronic device is enabled to perform operations comprising:

performing a screen-on interception in response to a screen wakeup operation performed by a user on the electronic device while a screen is in an off state, wherein performing the screen-on interception comprises preventing the screen from being lit up, and the screen is not lit up when the screen is in the off state;

drawing a to-be-displayed interface adapted to a screen orientation while performing the screen-on interception;

disabling the screen-on interception for the screen after drawing the to-be-displayed interface; and displaying the to-be-displayed interface based on the screen orientation after disabling the screen-on interception.

* * * * *